United States Patent
Nayar et al.

(10) Patent No.: US 7,924,321 B2
(45) Date of Patent: Apr. 12, 2011

(54) APPARATUS AND METHOD FOR HIGH DYNAMIC RANGE IMAGING USING SPATIALLY VARYING EXPOSURES

(75) Inventors: Shree K. Nayar, New York, NY (US); Tomoo Mitsunaga, New York, NY (US)

(73) Assignees: The Trustees of Columbia University in the City of New York, New York, NY (US); Sony Corporation, Tokyo (JP)

( * ) Notice: Subject to any disclaimer, the term of this patent is extended or adjusted under 35 U.S.C. 154(b) by 1716 days.

(21) Appl. No.: 10/886,746

(22) Filed: Jul. 7, 2004

(65) Prior Publication Data

US 2004/0239798 A1 Dec. 2, 2004

Related U.S. Application Data

(62) Division of application No. 09/326,422, filed on Jun. 4, 1999, now Pat. No. 6,864,916.

(51) Int. Cl.
*H04N 5/235* (2006.01)
*H04N 9/73* (2006.01)

(52) U.S. Cl. ............... 348/224.1; 348/221.1; 348/229.1; 348/362

(58) Field of Classification Search ............... 348/220.1, 348/221.1, 222.1, 224.1, 229.1, 230.1, 294, 348/296, 297, 362, 363, 364, 365, 234, 235, 348/236, 237, 238, 241, 250, 298, 311, 256, 348/295, 342, 219.1, 218.1; 358/518, 504, 358/520, 525, 523, 534; 382/274, 254, 26, 382/260

See application file for complete search history.

(56) References Cited

U.S. PATENT DOCUMENTS

| 4,623,928 | A | 11/1986 | Handy |
| 4,652,916 | A | 3/1987 | Suzaki et al. |
| 4,868,649 | A | 9/1989 | Gaudin |
| 4,873,561 | A | 10/1989 | Wen |

(Continued)

FOREIGN PATENT DOCUMENTS

DE 4305807 10/1994

(Continued)

OTHER PUBLICATIONS

U.S. Patent Application Publication No. US2002/0050518 to Roustaei, published May 2, 2002.

(Continued)

*Primary Examiner* — David L Ometz
*Assistant Examiner* — Peter Chon
(74) *Attorney, Agent, or Firm* — Byrne Poh LLP

(57) ABSTRACT

Apparatus and methods are provided for obtaining high dynamic range images using a low dynamic range image sensor. The scene is exposed to the image sensor in a spatially varying manner. A variable-transmittance mask, which is interposed between the scene and the image sensor, imposes a spatially varying attenuation on the scene light incident on the image sensor. The mask includes light transmitting cells whose transmittance is controlled by application of suitable control signals. The mask is configured to generate a spatially varying light attenuation pattern across the image sensor. The image frame sensed by the image sensor is normalized with respect to the spatially varying light attenuation pattern. The normalized image data can be interpolated to account for image sensor pixels that are either under or over exposed to enhance the dynamic range of the image sensor.

16 Claims, 25 Drawing Sheets

U.S. PATENT DOCUMENTS

| | | | |
|---|---|---|---|
| 4,918,534 A | 4/1990 | Lam et al. | |
| 5,030,985 A | 7/1991 | Bryant | |
| 5,185,671 A | 2/1993 | Lieberman et al. | 348/229.1 |
| 5,193,016 A | 3/1993 | Cornuejols | |
| 5,282,063 A | 1/1994 | Deacon et al. | |
| 5,373,322 A * | 12/1994 | Laroche et al. | 348/273 |
| 5,420,635 A | 5/1995 | Konishi et al. | |
| 5,455,621 A | 10/1995 | Morimura | |
| 5,638,119 A | 6/1997 | Cornuejols | |
| 5,670,280 A | 9/1997 | Lawandy | |
| 5,703,677 A | 12/1997 | Simoncelli et al. | |
| 5,767,987 A | 6/1998 | Wolff et al. | |
| 5,789,737 A | 8/1998 | Street | |
| 5,801,773 A | 9/1998 | Ikeda | 348/229.1 |
| 5,828,793 A * | 10/1998 | Mann | 382/284 |
| 5,990,952 A | 11/1999 | Hamazaki | |
| 6,122,408 A | 9/2000 | Fang et al. | 382/274 |
| 6,124,974 A | 9/2000 | Burger | 359/621 |
| 6,501,504 B1 | 12/2002 | Tatko et al. | 348/229.1 |
| 6,753,909 B1 * | 6/2004 | Westerman et al. | 348/229.1 |

FOREIGN PATENT DOCUMENTS

| | | | |
|---|---|---|---|
| DE | 44 20 637 A1 | | 12/1995 |
| DE | 196 18 476 A1 | | 11/1997 |
| GB | 2 255 465 A | | 11/1992 |
| GB | 2 331 426 A | | 5/1999 |
| GB | 2331426 A | * | 5/1999 |
| JP | 59-217358 A | | 12/1984 |
| JP | 06-141229 A | | 5/1994 |
| JP | 07-115643 A | | 5/1995 |
| JP | 07-254965 A | | 10/1995 |
| JP | 07-254966 A | | 10/1995 |
| JP | 08-154201 A | | 6/1996 |
| JP | 08-223491 A | | 8/1996 |
| JP | 08-331461 A | | 12/1996 |
| JP | 08-340486 A | | 12/1996 |
| JP | 10-069011 A | | 3/1998 |
| JP | 10-270673 A | | 1/1999 |
| WO | 90/01844 A1 | | 2/1990 |
| WO | 93/14595 A1 | | 7/1993 |
| WO | 97/05742 A1 | | 2/1997 |

OTHER PUBLICATIONS

International Search Report of the International Searching Authority, International Patent Application No. PCT/US00/14515, Dec. 4, 2000.

Written Opinion of the International Preliminary Examining Authority, International Patent Application No. Pct/US00/14515, Mar. 13, 2002.

* cited by examiner

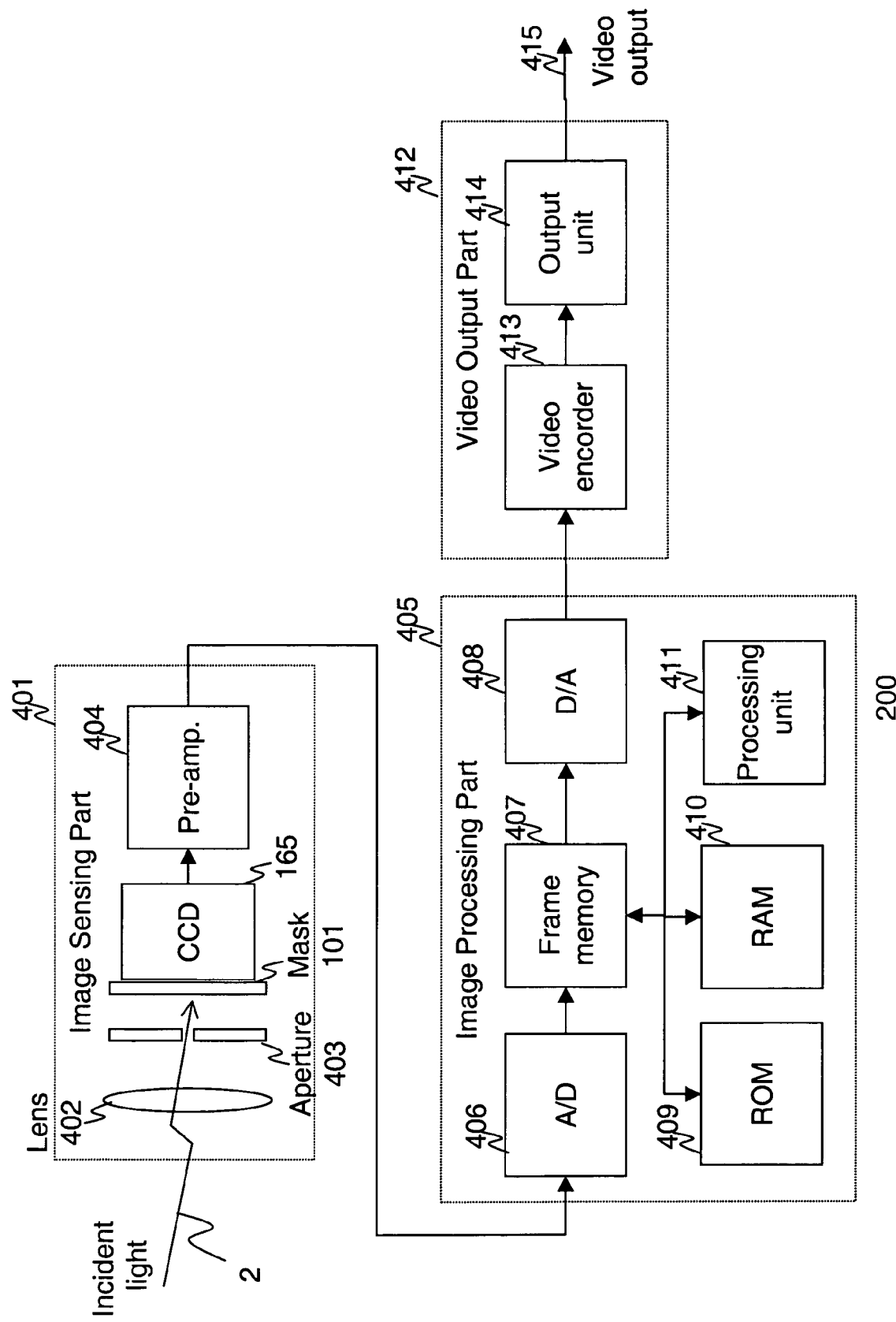

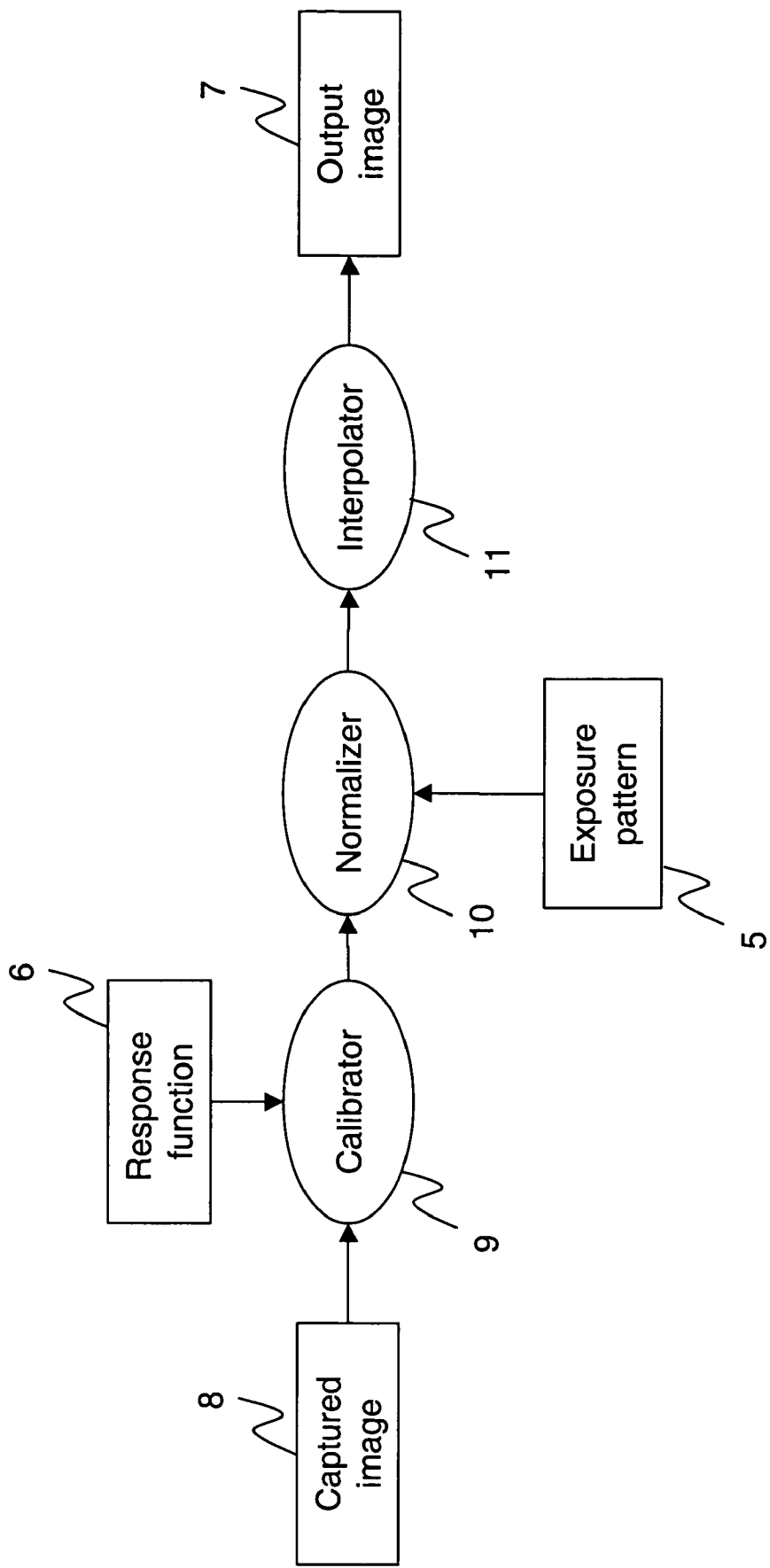

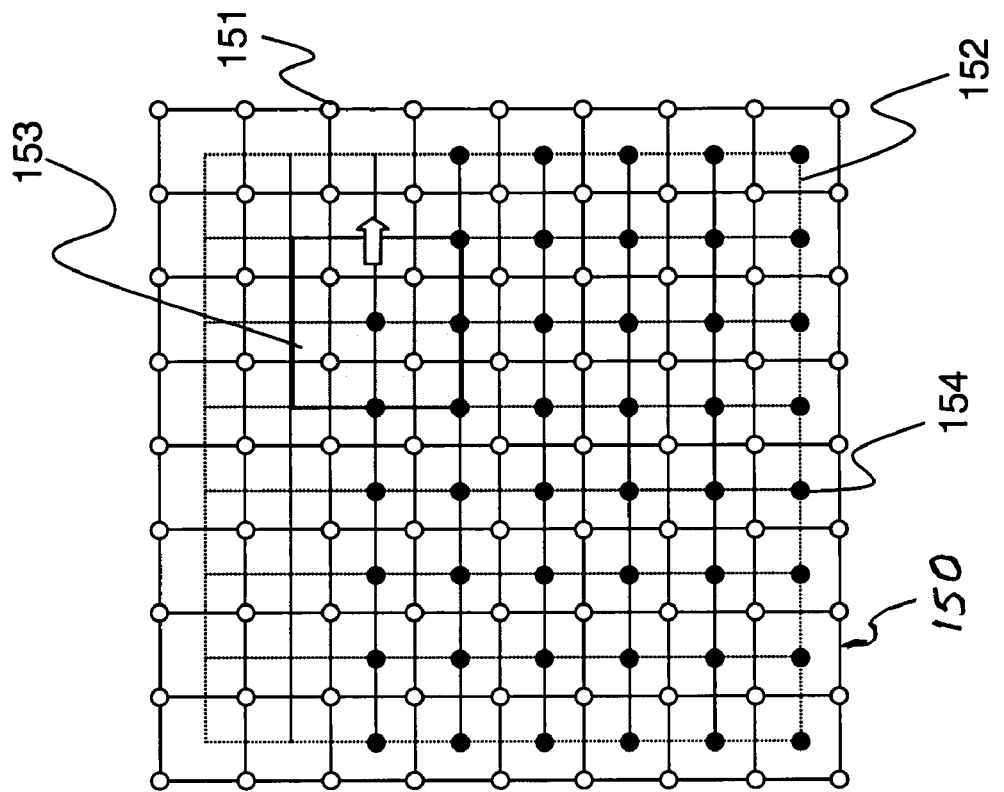
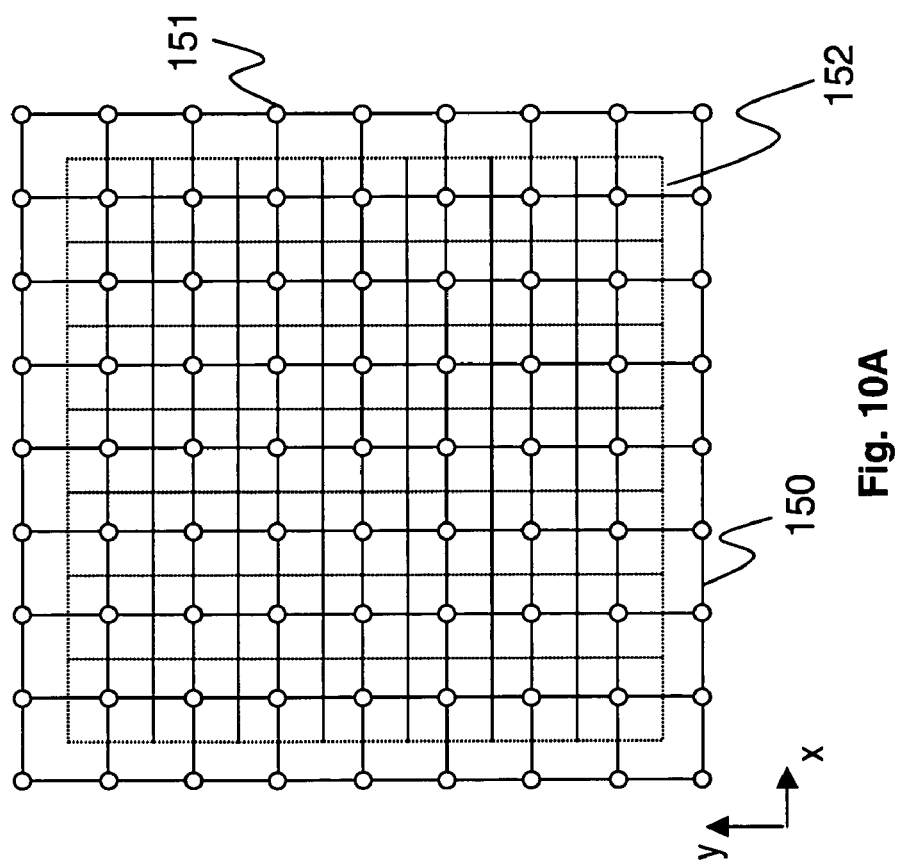
Fig. 10B
Fig. 10A

310

600

1100

1200

APPARATUS AND METHOD FOR HIGH DYNAMIC RANGE IMAGING USING SPATIALLY VARYING EXPOSURES

CROSS REFERENCE TO RELATED AND PRIORITY APPLICATION

This is a divisional of U.S. patent application Ser. No. 09/326,422, filed Jun. 4, 1999, now U.S. Pat. No. 6,864,916.

BACKGROUND OF INVENTION

The present invention relates to apparatus and method for capturing an image of a scene, and, more particularly, to apparatus and method for capturing a high dynamic range image using a low dynamic range image sensor.

Virtually any real world scene produces a very large range of brightness values. In contrast, known image sensing devices have very limited dynamic ranges. For example, it is typical for a video sensor to produce 8-bits or less of grey-level or color information. In the case of grey-scale images, 8-bits provide only 256 discrete grey levels, which is not sufficient to capture the fine details of most real life scenes.

A known solution to the problem of capturing high dynamic range images with a low dynamic range image sensor is to take multiple image measurements for each local scene area while varying the exposure to light from the scene. Such exposure variation is typically accomplished by sequentially taking multiple images of the scene with different exposures and then combining the multiple images into a single high dynamic range image. Temporal exposure variation techniques for enlarging the dynamic range in imaging a scene may be found for example in: U.S. Pat. No. 5,420,635 to M. Konishi et al., issued May 30, 1995; U.S. Pat. No. 5,455,621 to A. Morimura, issued Oct. 3, 1995; U.S. Pat. No. 5,801,773 to E. Ikeda, issued Sep. 1, 1998; U.S. Pat. No. 5,638,118 to K. Takahashi et al., issued Jun. 10, 1997; U.S. Pat. No. 5,309,243 to Y. T. Tsai, issued May 3, 1994; Mann and Picard, "Being 'Undigital' with Digital Cameras: Extending Dynamic Range by Combining Differently Exposed Pictures," Proceedings of IST's 48th Annual Conference, pp. 422-428, May 1995; Debevec and Malik, "Recording High Dynamic Range Radiance Maps from Photographs," Proceedings of ACM SIGGRAPH, 1997, pp. 369-378, August 1997; and T. Misunaga and S. Nayar, "Radiometric Self Calibration," IEEE Conference on Computer Vision and Pattern Recognition (CVPR 99), June 1999. However, techniques that require acquiring multiple images while temporally changing the exposure have the fundamental problem in that variations in the scene may take place between exposure changes. In other words, these techniques are useful only for static scenes where the scene radiance values stay constant. Moreover, between exposure changes the position and orientation of the imaging device and its components must remain constant. Finally, because a greater time is needed to sequentially capture all the required images, the temporal exposure variation techniques are not suitable for real time applications.

Another known solution to the problem of capturing high dynamic range images with a low dynamic range image sensor is to simultaneously capture multiple images of a scene using different exposures. Such a technique is disclosed, for example, in Yamada et al., "Effectiveness of Video Camera Dynamic Range Expansion for Lame Detection," Proceedings of the IEEE Conference on Intelligent Transportation Systems, 1997. Typically, two optically aligned CCD light-sensing arrays are used to simultaneously capture the same image of a scene with different exposures. Light from the scene is divided by a beam splitter and directed to both CCD light-sensing arrays. The two captured images are combined into one high dynamic range image by a post processor. This technique has the disadvantage of requiring complex and expensive optics, and capturing images with more than two different exposures becomes difficult.

Efforts have been made to increase the dynamic range of charge-couple imaging devices. Published Japanese patent application No. 59,217,358 of M. Murakoshi describes using two or more charge coupled device (CCD) light-sensing cells for each pixel of the imaging device. Each of the light-sensing cells of a pixel have different photo sensitivities so that some cells will take longer to reach saturation than others when exposed to light from a scene. In this manner, when the store photogenerated charge in all of the light-sensing cells of a pixel are combined, the dynamic range of the pixel is effectively increased. However, the Murakoshi reference does not address the problem of capturing high dynamic range images using a low dynamic range image sensor.

U.S. Pat. No. 4,590,367 to J. Ross et al. discloses an arrangement for expanding the dynamic range of optical devices by using an electrically controlled light modulator adjacent to the light-sensitive area of an optical device to reduce the brightness of incident light from an imaged optical scene so as to not exceed the dynamic range or the light-sensitive area. The light modulator of the Ross et al. reference has individual pixel control of light amplification or attenuation in response to individual control signals. The detected level of light intensity emerging from each pixel of the modulator is then used to develop the control signals to adjust the amplification or attenuation of each pixel of the modulator to bring the brightness level into the detector's rated dynamic range. Thus, wide input light intensity dynamic range is reduced to a narrow dynamic range on a pixel-by-pixel basis. However, the apparatus and method of the Ross et al. reference is aimed at simplifying three-dimensional measurement using projected light, and there is nothing in the reference on how to capture a high dynamic range image.

Another problem of known systems for capturing high dynamic range images is the display of such images using low dynamic range displays. Most commercially available displays, such as video monitors, televisions and computer displays, have low dynamic ranges. Hence, after the high dynamic range image is obtained, one needs to use a mapping method to display the image on a low dynamic range display while preserving the pertinent visual information. In other words, the dynamic range of the captured image must be compressed while preserving visual details of the scene.

A known technique for compressing the dynamic range of a captured image is tone curve (or response curve) reproduction, in which a high dynamic range color scale is mapped into a low dynamic range color scale using an appropriate tone curve. Logarithmic scale conversion and gamma correction are examples of this kind of compression. However, tone curve reproduction compression does not preserve visual details of the scene.

A more sophisticated tone curve reproduction technique is histogram equalization, which creates a tone curve by integrating the color histogram of the image. Histogram equalization results in a more even redistribution of the colors in the image over the space of colors, but this technique cannot sufficiently preserve the detail of an image which has several local areas with very bright (or very dark) pixels, where such local areas together may span the complete range of grey levels. Hence, details within individual areas are not enhanced by the histogram equalization process.

Another technique for compressing the dynamic range of a captured image is disclosed in Pattanaik et al., "A Multiscale Model of Adaptation and Spatial Vision for Realistic Image Display," SIGGRAPH 98 Proceedings, pp. 287-298, 1998. This technique divides the image data into several frequency component images, for example, in a Laplacian pyramid. The image is then re-composed after each frequency component has been modulated in a different manner. An advantage of this technique is that absolute pixel values do not contribute so much, unlike histogram equalization. However, this technique has the drawback of requiring large amounts of memory and extensive computations to obtain the frequency component images.

Accordingly, there exists a need for an apparatus and method for capturing high dynamic range images using a relatively low dynamic range image sensor and for detail preserving compressing the captured high dynamic range image for display by relatively low dynamic range display device, which overcomes the problems of the prior art as discussed above.

SUMMARY OF THE INVENTION

In accordance with the present invention, there is provided a system for high dynamic range imaging comprising an image sensor having an array of light-sensing elements. The image sensor senses the image of a scene and provides corresponding pixel values representing the light intensities impinging on each of the light-sensing elements thereof. The image sensor provides a saturated pixel value when the intensity of light impinging on a corresponding light-sensing element is greater than a first threshold value and provides a blackened pixel value when the intensity of light impinging on a corresponding light-sensing element is below a second threshold level. The image sensor has a low dynamic range relative to the range of light intensities in the optical image of the scene.

The system includes a mask interposed between the scene and the image sensor. The mask has a multiplicity of light transmitting cells, each controlling the exposure of a respective one or more of the light-sensing elements of the image sensor to light from the scene. Each of the light-sensing elements having a corresponding exposure value determined by the transparency of the cell through which light impinging on the light-sensing element passes.

The system further includes a first memory storing exposure values corresponding to the light-sensing elements and an image processor coupled to the image sensor for receiving the pixel values provided thereby and coupled to the first memory for receiving the exposure values corresponding to the light-sensing elements. The image processor has a normalizer for mapping the pixel values by a function of the exposure values to derive corresponding normalized pixel values. An example of such mapping is to divide each of the pixel values by a respective exposure value.

According to a first exemplary embodiment of the present invention, the exposure values corresponding to the light-sensing elements are fixed and the image processor further includes an interpolator for interpolating the normalized pixel values to derive interpolated pixel values at respective positions in a second array overlapping the array of light-sensing elements. The interpolation process may omit normalized pixel values that correspond to saturated pixel values or blackened pixel values.

Where the response function of the image sensor is not linear, the system may include a second memory for storing the response function of the image sensor, and the image processor is coupled to the second memory for receiving the response function and further includes calibration means for linearizing the pixel values provided by the image sensor in accordance with the response function before the pixel values are normalized by the normalizer.

According to a second exemplary embodiment of the present invention, the exposure value of each cell of the mask is alterable by applying a respective exposure control signal to the mask. The system includes a mask controller coupled to the image sensor for receiving the pixel values provided thereby and for computing, and applying to the mask, exposure control signals for minimizing the number of saturated pixel values and blackened pixel values from the corresponding area of the image sensor, and providing exposure values corresponding to the applied exposure control signals. The normalizer then normalizes each of the pixel values from the image sensor to derive normalized pixel values which represent a radiance image of the scene.

The dynamic range of the captured high dynamic range image is compressed to allow viewing on a display having a relatively low dynamic range by providing a smoother coupled to an exposure pattern memory for receiving exposure values stored therein and applying a smoothing filter to the exposure values to derive smooth exposure values corresponding to the normalized pixel values. Also provided is an exposure reapplicator coupled to the normalizer of the image processor for receiving the normalized pixel values and for multiplying each of the normalized pixel values with a corresponding smoothed exposure value to derive monitor image pixel values of an image having compressed dynamic range but without substantial loss of image detail.

In an alternative implementation of the first exemplary embodiment of the present invention, a mask is not used but the array of light-sensing elements of the image sensor has a spatially varying pattern of photosensitivities to incident light and corresponding photosensitivity values indicative of the respective photosensitivities. The photosensitivity values are stored in the first memory and are used by the normalizer in conjunction with respective pixel values from the image sensor to derive corresponding normalized pixel values, and there is provided an interpolator for interpolating the normalized pixel values to derive interpolated pixel values at positions in a second array overlapping the array of light-sensing elements.

In accordance with another aspect of the present invention, there is provided a method for high dynamic range imaging comprising the steps of exposing an image sensor having an array of light-sensing elements to an image of a scene using a spatially varying exposure. The image sensor senses the image and provides corresponding pixel values representing light intensities impinging on respective ones of the light sensing elements. The image sensor provides a saturated pixel value when the intensity of light impinging a respective light-sensing element is greater than the first threshold level and providing a blackened pixel value when the intensity of the light impinging on a respective light-sensing element is below a second threshold level. The image sensor having a low dynamic range relative to the range of light intensities in the image of the scene. The method further comprises the step of normalizing the pixel values provided by the image sensor using respective exposure values to derive corresponding normalized pixel values.

According to one implementation of the method, the step of exposing the image sensor using a spatially varying exposure includes the step of using a mask having a multiplicity of light-transmitting cells each controlling the exposure of a respective one or more of the light-sensing elements to light from the scene. Each of the light-sensing elements having a corresponding exposure value indicative of the transparency of the cells through which light impinging on the light-sensing element passes, and the step of normalizing the pixel values provided by the image sensor includes the step of mapping the pixel values by a function of the exposure values.

In another implementation of the method, the exposure values corresponding to the light-sensing elements are fixed, and the method further comprises interpolating the normalized pixel values to derive interpolated pixel values at respective positions of a second array overlapping the array of the light-sensing elements.

In a further implementation, the method comprises the step of calibrating the pixel values provided by the image sensor according to a response function of the image sensor to linearize the pixel values before the step of normalizing the pixel values.

In still another implementation of the method, the exposure value corresponding to each of the light-sensing elements is alterable by applying a respective exposure control signal to the mask. The method further comprises the steps of computing from the pixel values provided by the image sensor exposure control signals for minimizing the number of saturated pixel values and blackened pixel values from the image sensor, and applying the computed exposure control signals to the mask, as well as providing exposure values corresponding to the applied exposure control signals for use in the normalizing step.

In a still further implementation, the method comprises the step of applying a smoothing filter to the exposure values corresponding to the applied exposure control signals to derive smoothed exposure values corresponding to the normalized pixel values. The smoothed exposure values are then reapplied to the normalized pixel values by multiplying each normalized pixel value with a corresponding smooth exposure value to derive monitor image pixel values representing an image having compressed dynamic range but with visual details of the image preserved.

In accordance with still another aspect of the present invention, there is provided a method for high dynamic range imaging comprising the steps of exposing a frame of photographic film in a film camera to an image of a scene through a planar mask disposed between the shutter and the focal plane of the camera. The mask has a multiplicity of light transmitting cells each controlling the exposure of a respective region of the film. Each of the cells of the mask has an associated exposure value indicative of the transparency of the cell. The exposure values are stored in an exposure pattern memory. The exposed film is then processed to contain a masked image of the scene. The masked image contained on the film or a print thereof is scanned to obtain pixel values representative of the different regions of the masked image exposed on the film through the cells of the mask. The masked image, as represented by the pixel values, is aligned with the mask as represented by the exposure values such that each pixel value corresponds to an exposure value associated with the mask cell through which the region represented by the pixel value was exposed. The pixel values are then normalized using corresponding exposure values to derive normalized pixel values disposed at respective positions of a first array.

In one implementation of the method, there is included the further step of interpolating the normalized pixel values to derive interpolated pixel values at respective positions of a second array overlapping the first array. In another implementation of the method, there is further included the step of calibrating the pixel values according to a combined response function of the film and of the image sensor used to scan the masked image contained on the film.

BRIEF DESCRIPTION OF DRAWINGS

For a more complete understanding of the nature and benefits of the present invention, reference should be made to the following detailed description taken in conjunction with the accompanying drawings, in which:

FIG. 2 is a block diagram of the hardware components of a video camera implementation of the imaging system of FIG. 1;

FIG. 3 is a data flow diagram of the image processor of the system of FIG. 1;

FIG. 10A is a diagram depicting the original image grid having light-sensing elements of the image sensor disposed at respective intersections thereof superimposed on an interpolation grid;

FIG. 10B illustrates an interpolation filter applied to each different two pixel by two pixel region of the original image grid to derive interpolated pixels at respective intersections of the interpolation grid;

DETAILED DESCRIPTION

Figure 1:
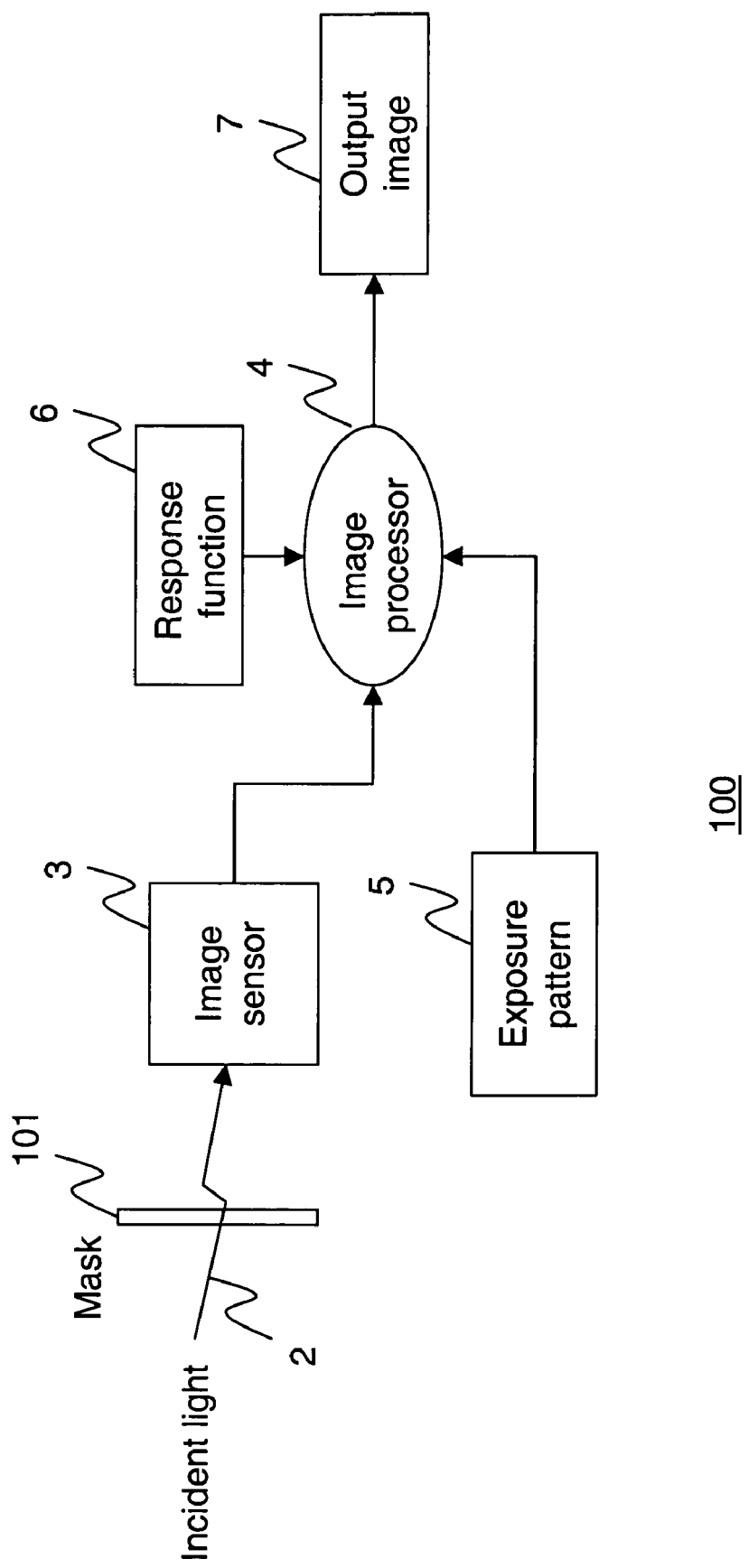
FIG. 1 is a functional diagram of an imaging system according to a first exemplary embodiment of the present invention.

Referring now to FIG. 1, there is shown a functional diagram of an imaging system 100 according to a first exemplary embodiment of the present invention. The system 100 includes a mask 101 through which incident light 2 from a scene (not shown) passes before impinging on an image sensor 3. The image sensor 3 senses an image of the scene as transmitted by the mask 101 and provides corresponding pixel values to an image processor 4, which is coupled to a response function memory 6 and an exposure pattern memory 5 and which provides high dynamic range image data to an output image memory 7. The mask 101 is a plate of transparent material which has neutral characteristics with respect to the wavelengths of the incident light and has a fixed spatial pattern of transparency in the region through which the incident light 2 passes. The term "light" as used in the specification and claims refers to electromagnetic radiation spanning the spectrum from the millimeter wave region to the gamma ray region. The image sensor 3 preferably comprises a charge coupled device (CCD) image detector having an array of light-sensing elements (not shown), but may be any other type of image sensor including photographic film. In general, the image sensor 3 will have a low dynamic range relative to the range of incident light 2 emanating from the scene. The response function data stored in memory 6 is the input/output characteristics of the image sensor 3, which has been previously measured and stored in the memory 6 as a look-up table, in parametric form or other appropriate data form. The exposure values stored in memory 5 are indicative of the transparency of the mask at each pixel position such that there is a corresponding exposure value for each pixel value provided by the image sensor 3. The exposure values were previously measured and stored in the exposure pattern memory 5 as raw or coded data. The image processor 4 derives high dynamic range image data from the pixel values provided by the image sensor 3, the response function data stored in memory 6 and the exposure values stored in memory 5. The high dynamic range image data, which is stored in the output image memory 7, has radiance values proportional to corresponding radiance values of the scene.

Turning now to FIG. 2, there are shown the hardware components of a video camera implementation 200 of the system of FIG. 1. The camera of FIG. 2 has an image sensing part 401, which includes a lens arrangement 402 for focusing an image of a scene onto the photosensitive surface of a CCD light-sensing array 165, an aperture 403 for controlling the overall exposure of the image, a mask 101 positioned in close proximity to the CCD light-sensing array 165 and a preamplifier 404 for adjusting the CCD output and for reducing noise. The preamplifier 404 includes several analog circuits which are usually used in a video camera, such as a correlated double circuit, an automatic gain control circuit, a gamma correction circuit and a knee circuit. The camera implementation 200 of FIG. 2 also includes an image processing part 405 having an analog-to-digital converter 406 for digitizing the signals from the image sensing part 401 corresponding to the captured images. The digitized images are stored in a frame memory 407 which corresponds to the output image memory 7 in FIG. 1. Computation of the high dynamic range image data is carried out in a processing unit 411, which has access to the data in the frame memory 407, a ROM 409 and a RAM 410. The ROM 409 is used to store the exposure values and the response function data, as well as the instructions for processing unit 411. The computed high dynamic range image in the frame memory 407 is converted to an analog signal by a digital-to-analog converter 408, which provides the analog signal to a video output part 412. The video output part 412, which is only needed in a video camera implementation and has no counterpart shown in FIG. 1, includes a video encoder 413 which encodes the converted analog image to a video signal. The video signal is then passed through an output unit 414 which provides a video output 415.

Figure 4B:
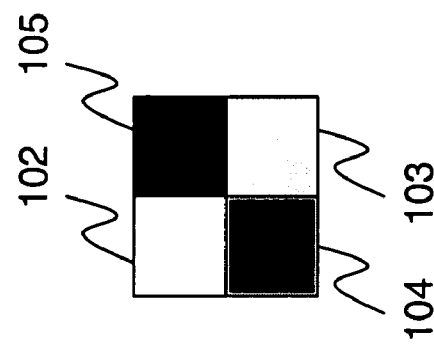
FIG. 4B depicts a group of four neighboring cells that are repetitively disposed to form the mask pattern of FIG. 4A.
Figure 4A:
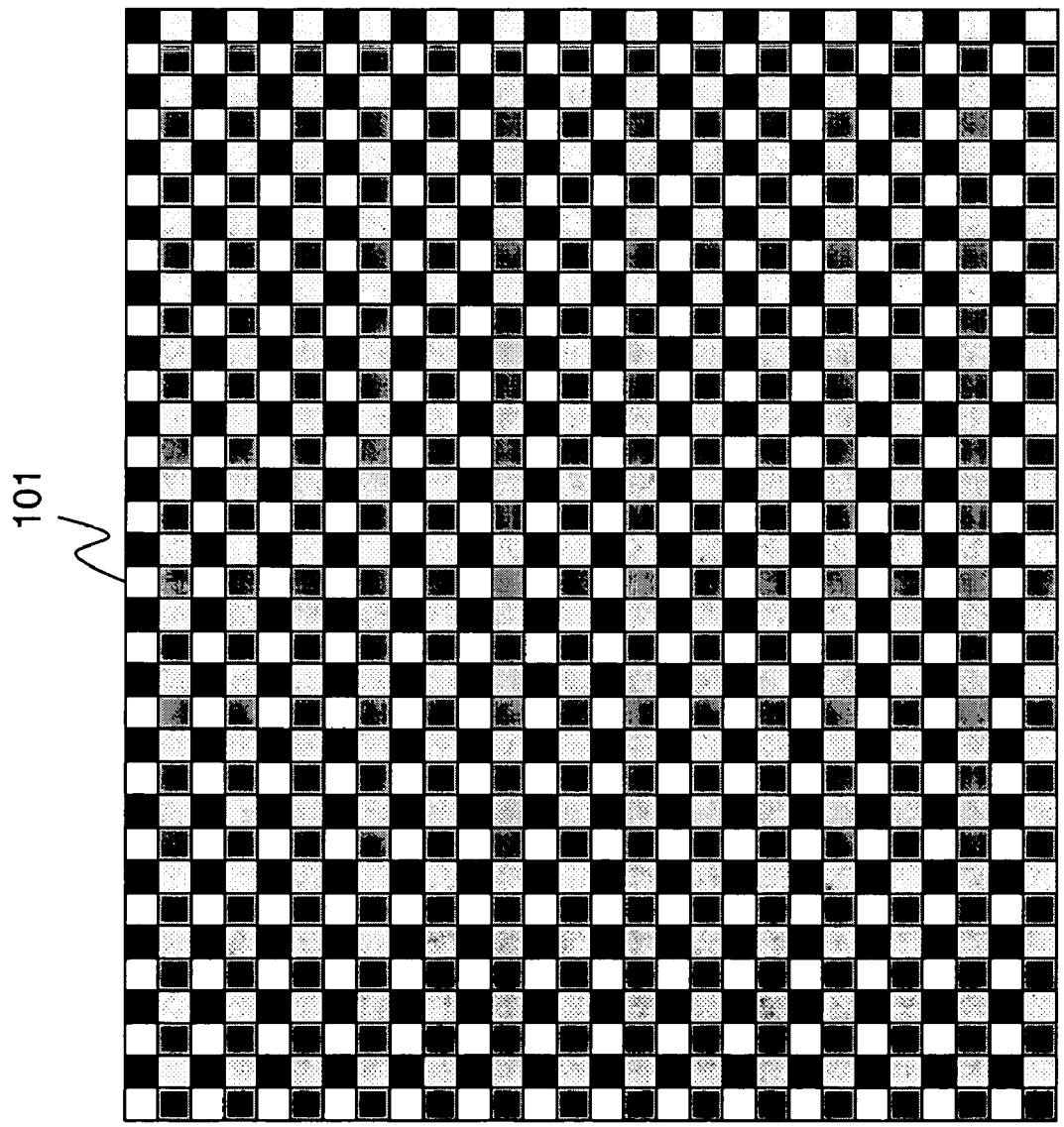
FIG. 4A is a plan view of the patterned mask used in the system of FIG. 1.

FIG. 3 shows a diagram 3000 of the data flow of the image processor 4 of FIG. 1. The image processor comprises calibrator 9, a normalizer 10 and an interpolator 11. The calibrator 9 maps image data 8 captured by the image sensor 3 into a linear response image by using the response function data stored in the response function memory 6. Then the normalizer converts the linear response image into an image which is proportional to the scene radiance. Finally, the interpolater 11 interpolates pixel values that cannot be computed because of saturation or blackening, and then provides the corrected image data to the output image memory 7. Interpolation may be used even in the absence of saturated or blackened pixels as a way of reducing noise. FIG. 4A shows an example of a mask pattern for the mask 101 used in the system of FIG. 1. In this mask example, the mask 101 is a two-dimensional array of cells with different transparencies (attenuations). The mask 101 consists of repetitively disposed identical groups of four cells having different transparencies. FIG. 4B shows the group of four cells 102, 103, 104 and 105, which is repetitively disposed to form the pattern of the mask 101 of FIG. 4A. The group has a brightest cell 102, a bright cell 103, a dark cell 104 and a darkest cell 105 with the brightest cell 102 being the most transparent and the darkest cell 105 being the least transparent of the four cells. While in the example of FIGS. 4A and 4B, a group of four cells are repetitively disposed to form the exposure pattern of the mask 101, groups having fewer or more cells having differing transparencies may be similarly repeated to form the same or a different exposure pattern. The exposure pattern of the mask need not be periodic and may even be random in distribution of transparencies. Moreover, the mask 101 may be constructed from a material that has a non-linear optical response. Such a material would have a transmittance (or attenuation) that varies in a non-linear manner with the intensity of the incident light. Such a mask would provide a detailed preserving optical filter that enhances the effective dynamic range of the imaging system while preserving visual details.

Where a solid-state image sensing device such as a CCD or CMOS light-sensing array is used, the mask pattern can be fabricated on the same substrate as the image sensing device using photolithography and thin film deposition, or the mask pattern may be formed by photolithography and etching of the device itself. In the case of a film camera, the mask may be positioned between the shutter and the plane of the film or be attached to the film itself. In lieu of the mask, the film itself may have a spatially varying light sensitivity. The checkered mask 101 lets every local area have four different exposures. Thus every local area is captured using the large dynamic range produced by the four different exposures. The exposure values of the cells in the checkered mask 101 are stored in the exposure value memory 5 to be used by the image processor 4.

Figures 5A, 5B:
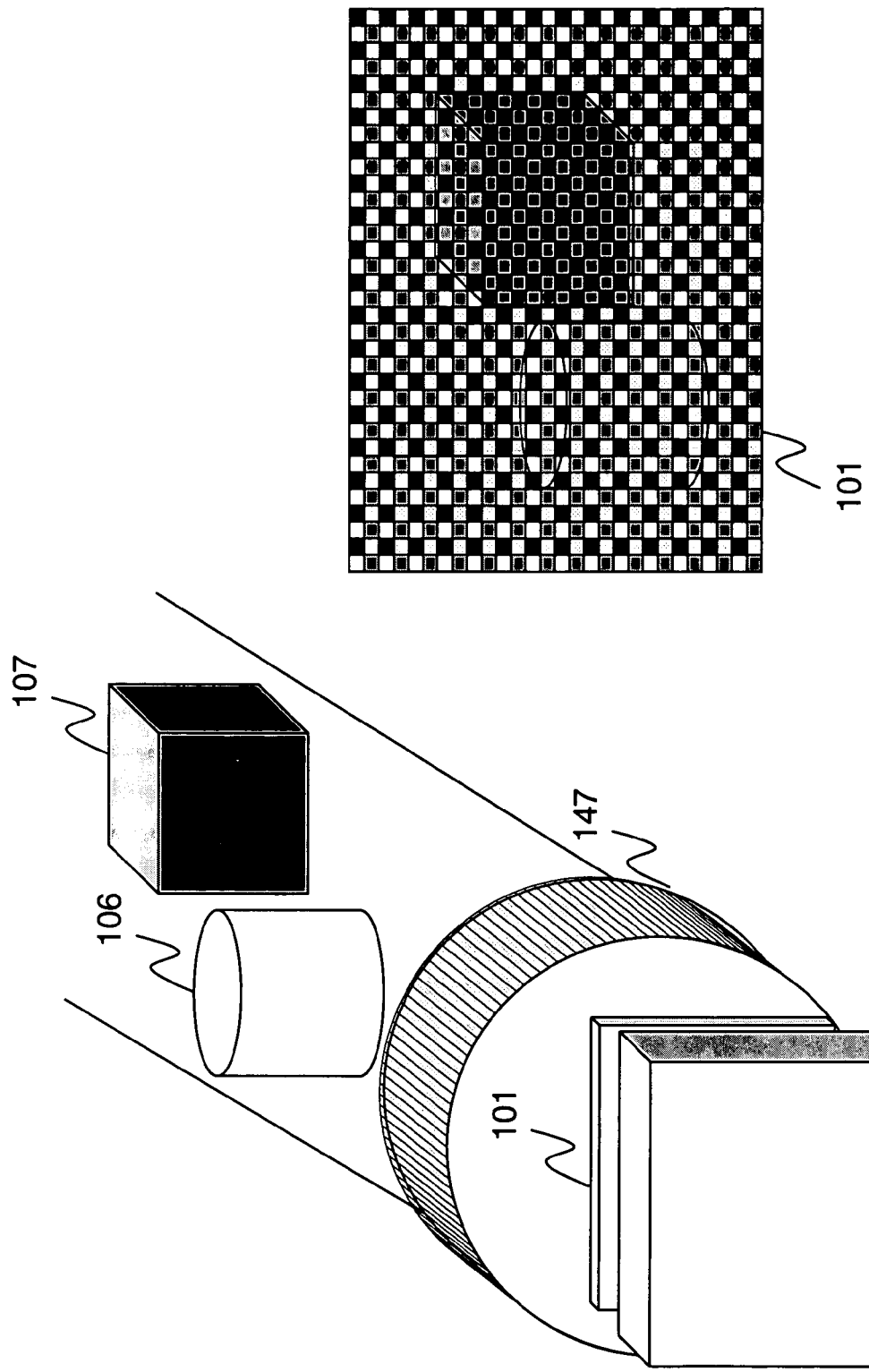
FIG. 5A depicts the imaging optics, the mask and image sensor of the system of FIG. 1 and objects in a scene whose image is being captured.
FIG. 5B depicts the image of the objects of the scene as viewed through the patterned mask of FIG. 4A.

FIGS. 5A and 5B illustrate the capture of an image of a scene with the checkered patterned mask 101. As shown in FIG. 5A, a masked plate 101 is placed in front of an image sensing device 165, and the mask plate 101 is aligned so that each mask cell is positioned in front of a respective pixel (i.e., a light-sensing element) of the image sensing device 165. Incident light from the scene passes through the imaging optics 147, then focuses onto the image plane of the image sensor 3, but the light intensity which is attenuated by the masked plate 101 is recorded at each pixel position. Also shown in FIG. 5A is a scene having a bright object 106 and a dark object 107. Thus an image like the one shown in FIG. 5B is obtained when the scene is captured by the image sensing device 165 through the masked plate 101. It should be noted that even if pixels of brighter exposure are saturated in an area of the bright object 106, pixels of darker exposure in the same area will still have values within the dynamic range of the image sensor 3. Similarly, even if pixels of darker exposure are too dark in an area of the dark object 107, pixels of brighter exposure in the same area will still have values within the dynamic range of the image sensor 3.

Figure 6:
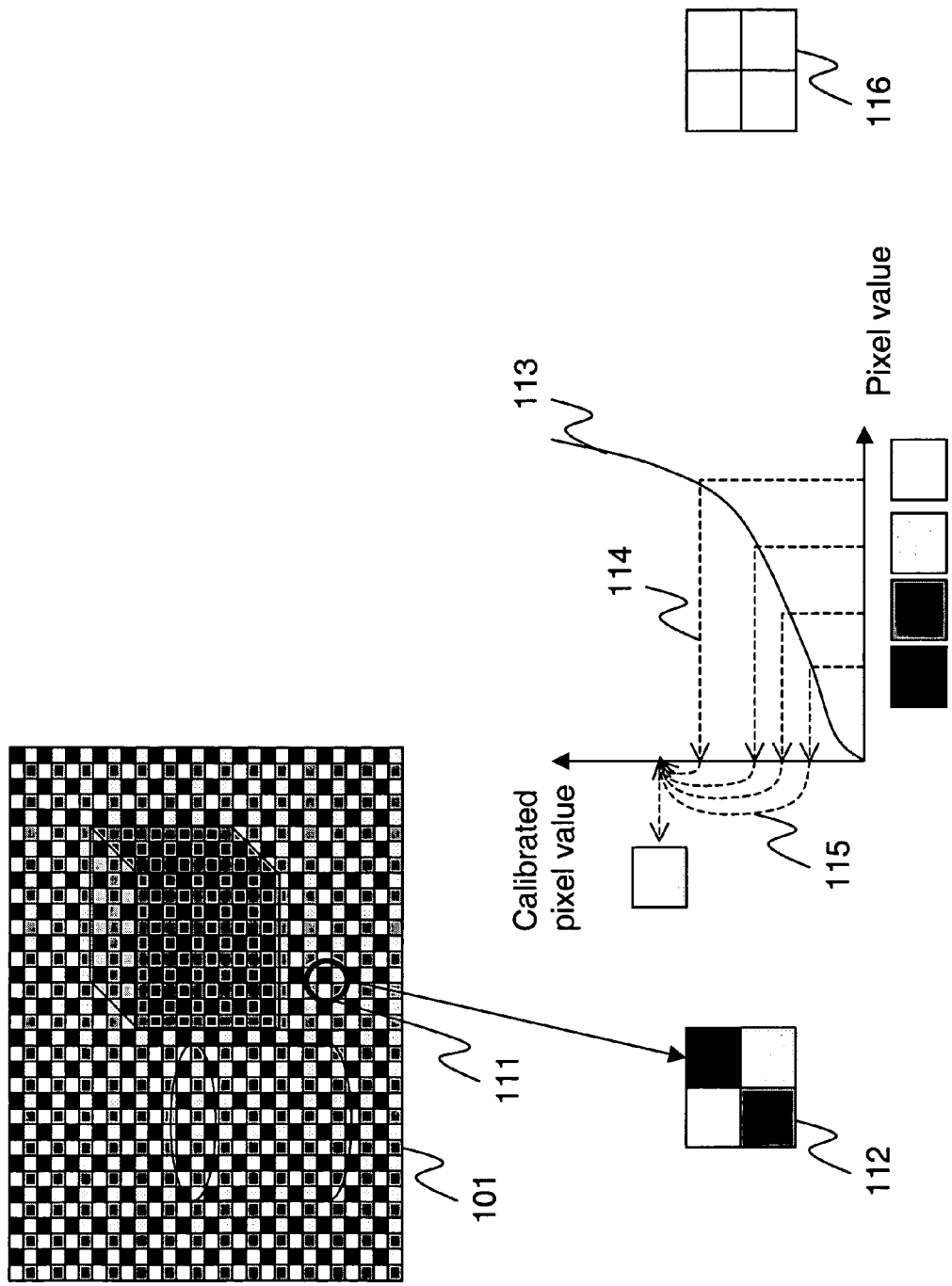
FIG. 6 are diagrams illustrating calibration and normalization as carried out by the system of FIG. 1 on four neighboring pixel values as detected through four neighboring cells of the mask.
Figure 7:
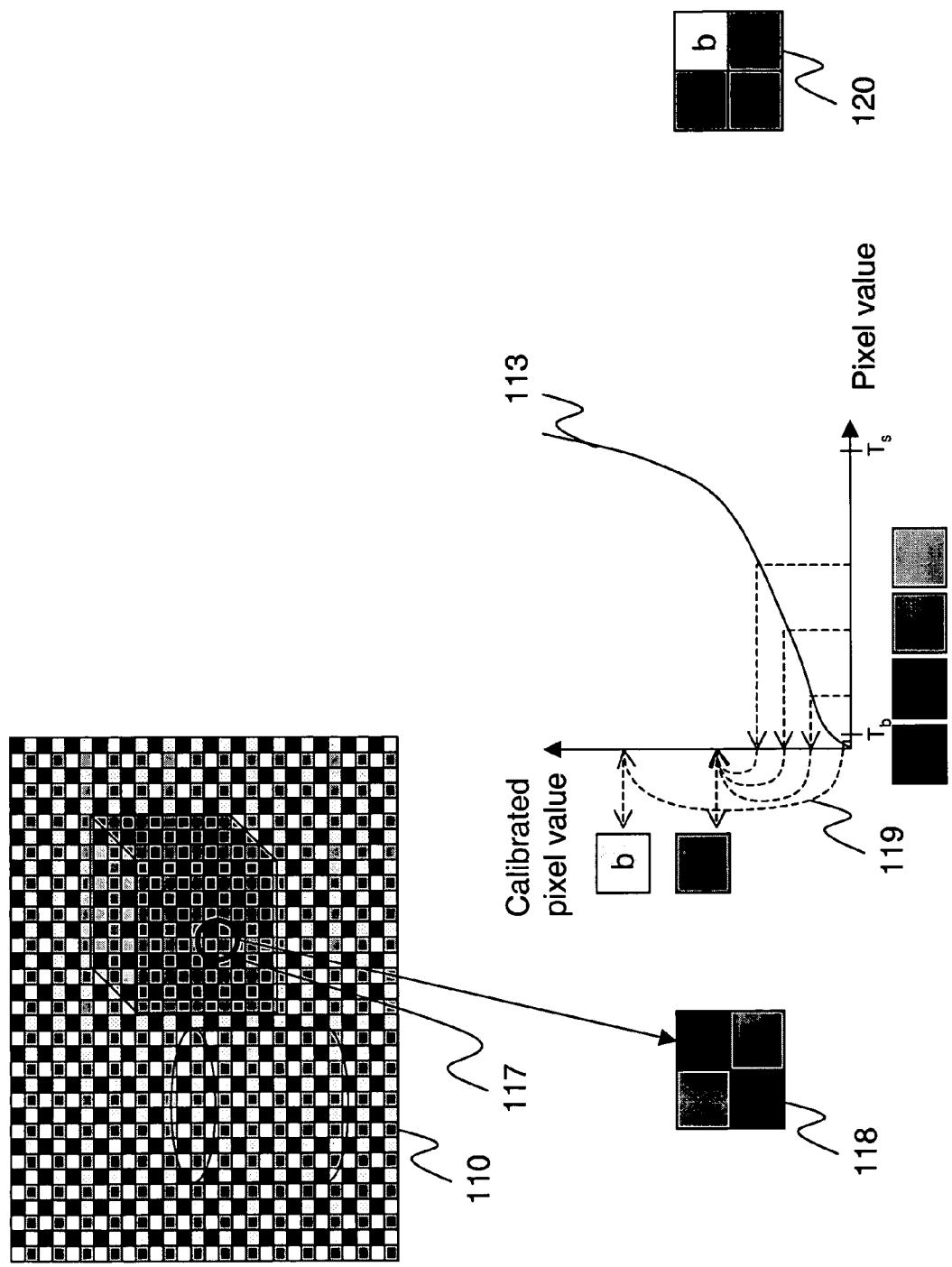
FIG. 7 are diagrams illustrating calibration and normalization as carried out by the system of FIG. 1 on four neighboring pixel values as detected through four neighboring cells of the mask, where one of the pixel values is a blackened pixel value.

FIG. 6 illustrates an example of the processing that is carried out by the calibrator 9 and the normalizer 10 of the image processor 4. In this example, a local area 112 of four neighboring pixels is taken from a region 111 in the background of the scene. Since the background of the scene is of constant brightness, the radiance values of the four pixels 112 are the same. However, the measured values of the four pixels differ because of non-linearities in the response function of the image sensor 3 and the differences in the exposure values corresponding to the four pixel locations as a result of the transparency pattern of the mask. The diagram at the center of FIG. 7 shows the process of converting each of the measured pixel values to a pixel value that is linear with respect to the scene radiance, and normalizing of the linearized pixel values. First, the calibration means 9 applies the response function of the image sensor 3 represented by the solid line response curve 113 to each of the measured pixel values to remove the non-linearity of the image sensor 3, as represented by the dotted lines 114. Each of the calibrated pixel values is then divided by its corresponding exposure value, as represented by the dotted lines 115. The result is represented by the diagram 116, which shows four calibrated and normalized pixel values in neighboring pixel locations having the same radiance. While normalization as used in the example of FIG. 6 involves dividing a pixel value by its corresponding exposure value, it is contemplated that normalization encompasses any mapping of pixel values by a function of the exposure values.

FIG. 7 illustrates another example of processing by the calibration means 9 and the normalizer 10 of the image processor 4, but this time the processing is on four neighboring pixel locations 118 taken from a dark region 117 of the scene. In the example of FIG. 7, three of the pixel locations have pixel values in the dynamic range of the image sensor 3 but one of the pixel locations has a blackened pixel value. Calibration and normalization of the four pixel values is shown in the diagram at the center of FIG. 7. In the pixel value axis of the diagram, the blackened pixel threshold and the saturated pixel threshold are indicated by $T_b$ and $T_s$, respectively. As shown in the diagram, the calibration and normalization process cannot be correctly applied to the blackened pixel value, as indicated by the broken line 119. Thus, the result of the calibration and normalization is represented by the diagram 120, which shows three calibrated and normalized pixel values having the same radiance and one blackened pixel value (marked with the letter "b") as to which calibration and normalization cannot be correctly applied.

Figure 8:
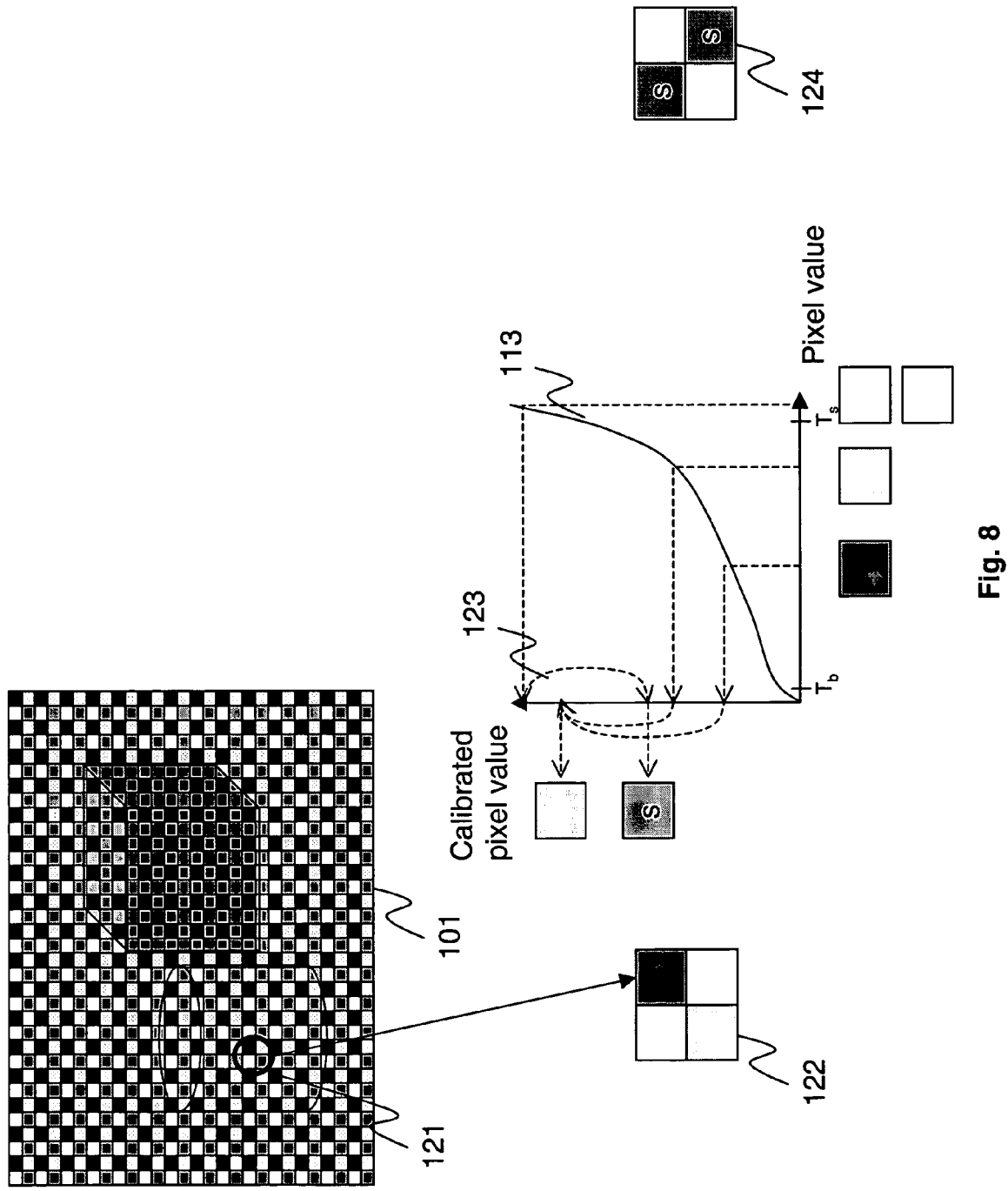
FIG. 8 are diagrams illustrating calibration and normalization as carried out by the system of FIG. 1 on four neighboring pixel values as detected through four neighboring cells of the mask, where two of the pixel values are saturated pixel values.

Turning now to FIG. 8, there is shown yet another example of processing by the calibrator 9 and the normalizer 10 of the image processor 4, but this time the processing is on four neighboring pixel locations 122 taken from a bright region 121 of the scene. Two of the four pixel locations 122 have pixel values in the dynamic range of the image sensor 3 while the other two have saturated pixel values. Calibration and normalization of the four pixel values are illustrated by the diagram at the center of FIG. 8. Once again the blackened pixel threshold and the saturated pixel threshold are indicated by $T_b$ and $T_s$, respectively, on the pixel value axis of the diagram. The two saturated pixel values cannot be correctly calibrated or normalized as indicated by the broken line 123. The result of the processing is represented by the diagram 124, which shows calibrated and normalized pixel values of the same radiance at two pixel locations and saturated pixel values (marked with the letter "s") at the other two pixel locations.

In accordance with the present exemplary embodiment, saturated or blackened pixel values are marked by the calibrating means 9 so that the interpolator 11 can treat such exceptions accordingly.

Figure 9:
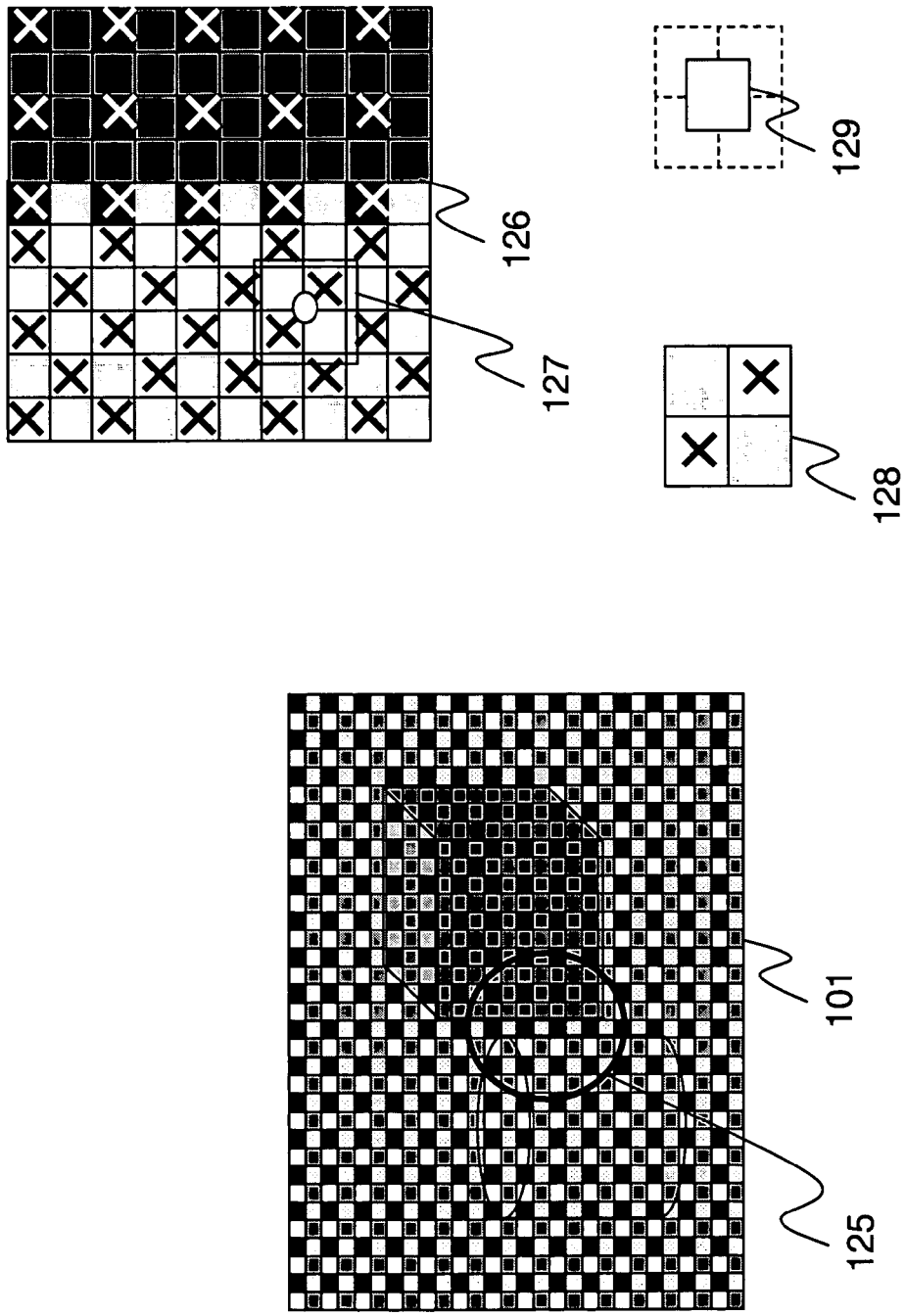
FIG. 9 are diagrams illustrating interpolation as carried out by the system of FIG. 1, in particular the application of a 2×2 interpolation filter to every 2×2 pixel local area of the masked image to derive interpolated pixel values.

FIG. 9 illustrates the interpolation process as carried out by the interpolator 11 of the image processor 4. At the upper right hand portion of the figure, there is shown a 10×10 group of pixels 126 representing the region 125 of the scene, which encompasses a boundary of dark and bright portions of the scene. The pixel values at the respective pixel locations 126 have undergone the calibration and normalization process described in connection with FIGS. 6, 7 and 8 and all saturated pixel are marked with a black "×" and all blackened pixel values are marked with a white "×." The interpolator applies a two pixel by two pixel interpolation filter to every different two pixel by two pixel region of the image pixel array. The interpolation filter computes an interpolated pixel value at the center of each two pixel by two pixel region by taking the average of non-saturated and non-blackened pixel values in the region. Since every different two pixel by two pixel region is exposed through four different transparencies of the mask, there will generally be at least one non-saturated and non-blackened pixel value in each region. At the position of the interpolation filter 127 shown in the FIG. 9, the two pixel by two pixel region encompassed by the interpolation filter includes two saturated pixel values, which are not taken into account by the interpolation process. As a result, an interpolated pixel 129 is obtained at the center of the two pixel by two pixel region having a value which is the average of two non-saturated and non-blackened pixel values in the region. Alternatively, saturated and blackened pixels may be assigned respective predefined values and are included in the interpolation computation.

Advantageously, each pixel value is weighted in accordance its contribution in increasing the quality of the interpolated result. Because the four neighboring pixels are normalized by different exposure values, the signal-to-noise ratio (SNR) of each of the four pixels differs from each other. By weighting each pixel value with the SNR, the interpolation is made more immune to noise. Given the response function f(M) of pixel value M, the SNR of the pixel value can be computed as SNR(M)=f(M)/f'(M), where f'(M) is the first derivative of f(M).

The interpolation process carried by the interpolator 11 of the image sensor 4 is further illustrated in FIGS. 10A and 10B. Referring to FIG. 10A, there is shown an original image grid 150 defined by spaced intersecting perpendicular lines extending in a vertical direction (the y direction) and in a horizontal direction (the x direction). The image sensor 3 comprises an array of light-sensing elements 151 disposed at respective intersections (pixel position) of the original image grid 150. The image sensor 3 providing a respective pixel value corresponding to each of the light-sensing elements when exposed to incident light. Overlapping the original image grid 150 is an interpolation grid 152 also defined by spaced intersecting perpendicular lines extending in the vertical direction and in the horizontal direction. Referring now to FIG. 10B, the interpolation filter 153 encompasses each different four intersection regions of the original image grid 150 to derive interpolated pixel values 154 at respective intersections of the interpolation grid. In the present exemplary embodiment, the interpolation grid is identical to the original image grid and is displaced from one another by a one-half grid position in the horizontal direction and a one-half grid position in the vertical position. It will be understood by those skilled in the art that the interpolation grid need not be identical to the original image grid and that interpolation filters other than a two pixel by two pixel averaging filter may be used, such as a bi-linear interpolation filter, a bi-cubic interpolation filter, a B-spline interpolation filter, a Gaussian interpolation filter or any other interpolation filter known to those skilled in the art. Moreover, it is noted that the disposition of the light-sensing elements need not be at intersections of a grid but may be any form of array.

Figure 11:
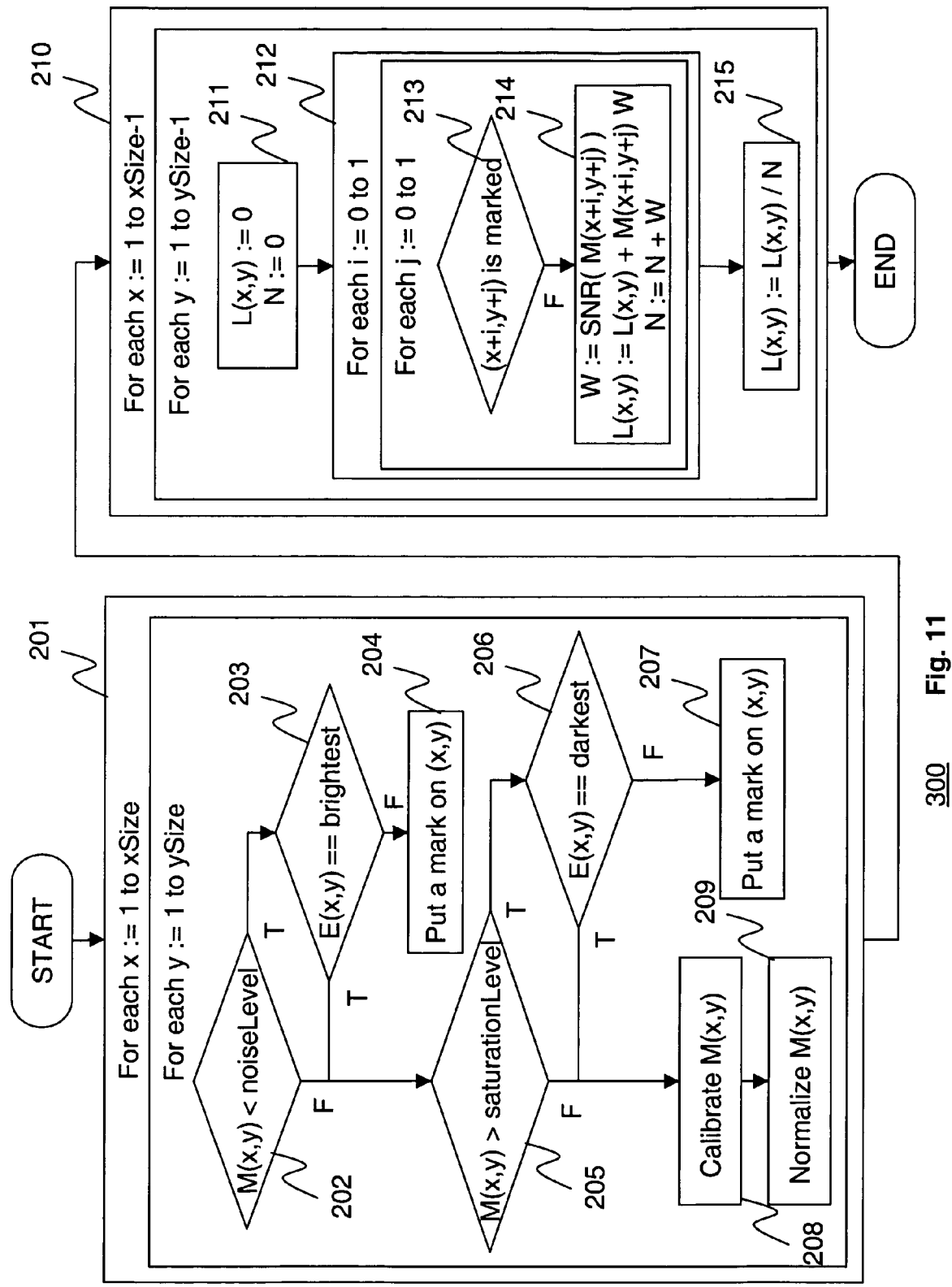
FIG. 11 is a flow diagram of the operation of the image processor of the system of FIG. 1.

Referring now to FIG. 11, there is shown a flow diagram 300 representing the processing which is carried out by the image processor 4. First, the process of loop 201 is repeated for each pixel location, where x and y are the x, y coordinates of the pixel location and xSize and ySize are the x dimension and the y dimension of the pixel array. Loop 201 includes steps 202, 203, 204, 205, 206, 207, 208 and 209. In step 202, pixel value M (x, y) at pixel location (x, y) is evaluated. If (x, y) is smaller than noise Level, which is a predefined small pixel value, then step 203 is carried out. If (x, y) is not smaller than noise Level, then step 205 is performed. In step 203, the exposure value E (x, y) corresponding to the pixel location is read from exposure pattern memory 5. If E (x, y) is the highest exposure value, then step 205 is performed. Otherwise, step 204 is carried out. In step 204, the pixel is marked as having a "blackened" pixel value and the current iteration of the loop terminates. The marking is done by writing a special value into the pixel location in temporary memory. In step 205, pixel value M (x, y) is evaluated. If M (x, y) is larger than saturation Level, which is a predefined very large pixel value, then step 206 is carried out. If M (x, y), is not larger than saturationLevel, then steps 208 and 209 are carried out. In step 206, the exposure value E (x, y) is read from memory 5. If E (x, y) is the lowest exposure value, then steps 208 and 209 are performed. Otherwise step 207 is carried out. In step 207, the pixel is marked as a "saturated" pixel value in temporary memory, and the current iteration of loop 201 is terminated. In step 208, M (x, y) is calibrated in a manner described in connection with FIGS. 6, 7 and 8. In step 209, M (x, y) is normalized as described in connection with FIGS. 6, 7 and 8, and the current iteration of loop 201 is terminated.

Figure 11A:
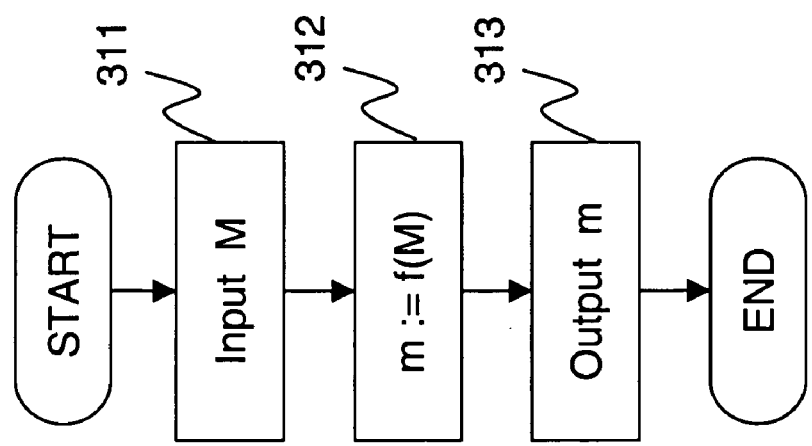
FIG. 11A is a flow diagram illustrating in greater detail the calibration step 208 of the flow diagram of FIG. 11.

Turning to FIG. 11A, there is shown a flow diagram of the details of the calibration step 208 of the flow diagram of FIG. 11, as carried out by the calibrator 9. In step 311, the pixel value M(x, y) at each pixel position (x,y) is provided as an input M. In step 312, the response function f is applied to M to obtain m. As described above, the response function can be in the form of a look-up table, a parametric form or other appropriate data form. Assuming that the response function data is in the form of look-up table with 256 levels, M is normalized and digitized into an index value indicating one of the 256 levels. The look-up table is then used to find f(M) with the index value corresponding to M. In step 313, M is provided as an output, which in the flow diagram of FIG. 11 is the pixel value M(x, y) provided to step 209.

Returning to FIG. 11, after loop 201 is completed for all pixel positions, loop 210 is processed. Loop 210 is repeated for each pixel position from location (1,1) to location (xSize−1, ySize−1). In loop 210, step 211, loop 212, steps 213, 214 and 215 are carried out. In step 211, L(x, y) and N are both initialized to zero. Here, L(x, y) indicates the radiance value at position (x, y) in the output image memory 7 and N indicates the number of pixels processed. Then the process of loop 212 is repeated with (i, j). Both, i and j vary from 0 to 1. In loop 212, steps 213 and 214 are carried out. In step 213, the marking of pixel (x+i, y+j) is determined. If the pixel is not marked, then step 214 is performed. Otherwise, the current iteration of the loop terminates. In step 214, weight value W is calculated as the SNR of pixel value M (x+i, y+j). Then pixel value M (x+i, y+j) is multiplied by W and the product is added to L (x, y), and W is added to N. After loop 212 is finished, step 215 is carried out. In step 215, L (x, y) is divided by N, after the which the loop terminates. After the loop 210 is completed for all pixel locations, the processing by the image processor 4 is completed.

Referring again to FIG. 1, the imaging system according to the first exemplary embodiment of the present invention may be modified by eliminating the mask 101 and using an image sensor 3 comprising an array of light-sensing elements (pixels) having a spatially varying pattern of photosensitivities. The photosensitivity pattern of the light-sensing elements are stored as respective sensitivity values in memory 5 in place of the exposure pattern. A respective response function for each pixel is stored in memory 6 in place of the single response function for the image sensor. Turning again to FIG. 3, the calibrator 9 receives pixel values of the captured image 8 and uses the respective response functions in memory 6 to linearize the pixel values. The linearized pixel values are then normalized by the normalizer 10 using the photosensitivity values stored in memory 5. The normalized pixel values are then interpolated in the manner described to derive the high dynamic range image pixel values.

Figure 12:
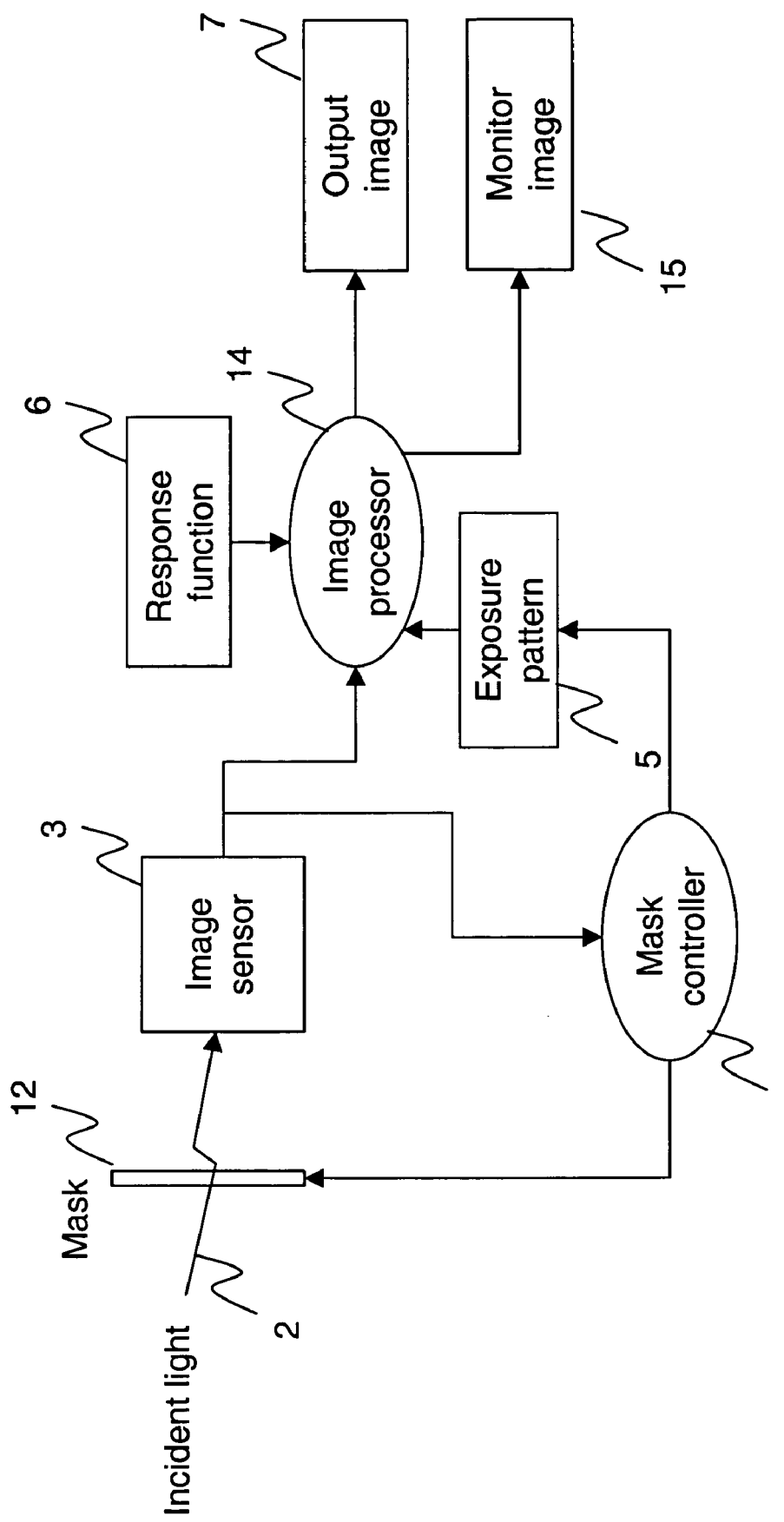
FIG. 12 is a functional block diagram of an imaging system according to a second exemplary embodiment of the present invention.

Turning now to FIG. 12, there is shown a functional block diagram 400 of an imaging system according to a second exemplary embodiment of the present invention. The system according to the second exemplary embodiment comprises a variable mask 12, a mask controller 13, an image sensor 3, an exposure pattern memory 5, a response function memory 6, an output image memory 7, an image processor 14, and a monitor image memory 15. Like the system of FIG. 1, incident light from a scene passes through a mask 12 having a spatially varying transparency pattern before impinging on the light sensitive surface of an image sensor 3 which provides corresponding pixel values to an image processor 14. The image processor 14 also receives response function data from the response function memory 6 and exposure values from an exposure pattern memory 5 and provides high dynamic range image data to an output image memory 7. However, unlike the system of FIG. 1, the system 400 of FIG. 12 employs a mask 12 having a transparency pattern that may be varied by the application of exposure control signals thereto, and a mask controller 13 that responds to the pixel values provided by the image sensor 3 for generating the exposure control signals applied to the mask 12 and corresponding exposure values provided to the exposure pattern memory 5. In addition, the image processor 14 provides monitor image data to be stored in the monitor image memory 15. The monitor image data have a compressed dynamic range with image detail preservation for display by a low dynamic range display device, such as a television, a video monitor or a computer display. The mask controller 13 receives the output of the image sensor 3, and adjusts the spatially varying transparency of the mask 12 such that saturated and blackened pixel values are minimized.

Figure 13:
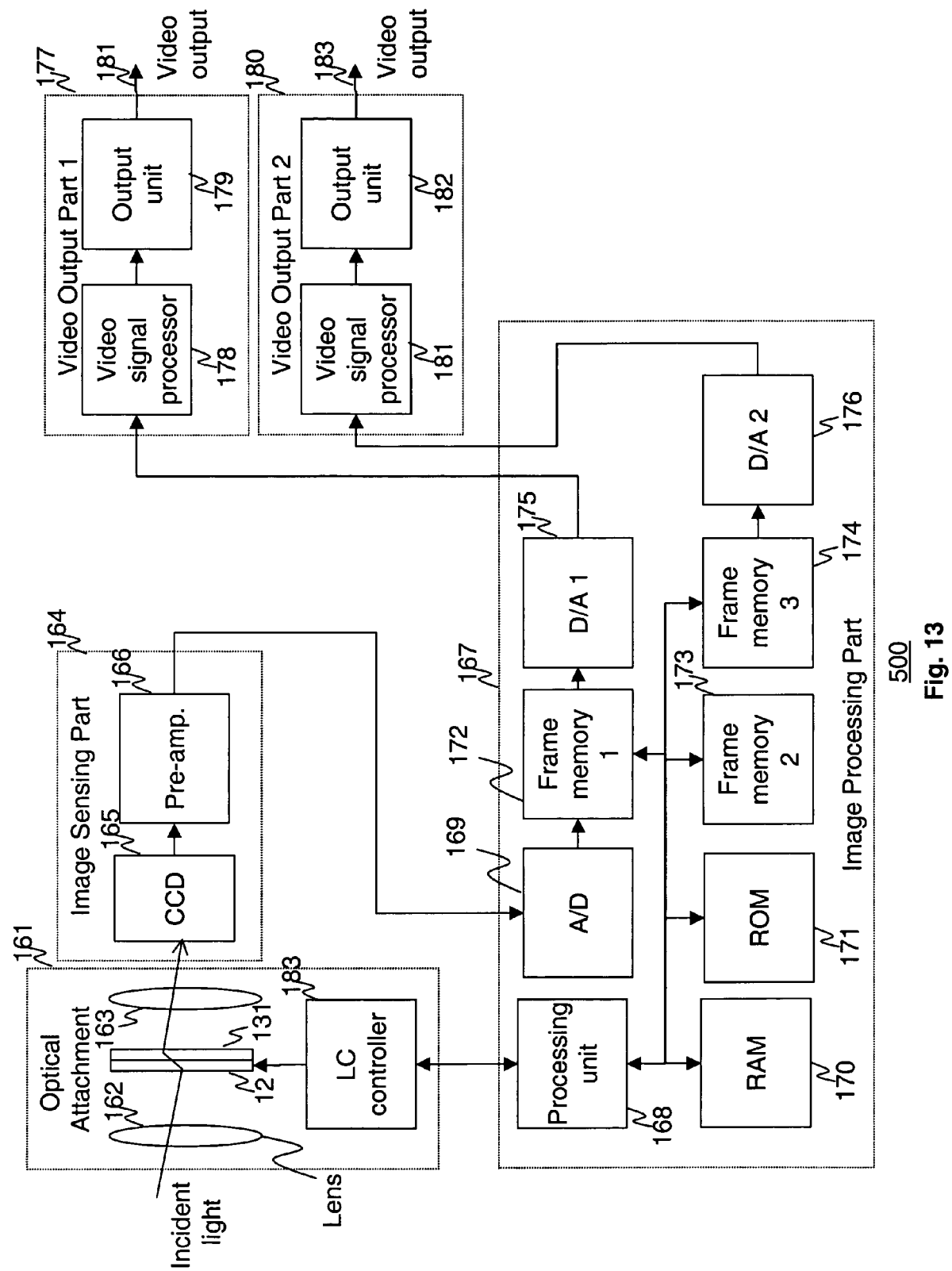
FIG. 13 is a block diagram depicting the hardware components of a video camera implementation of the imaging system of FIG. 12.

Turning now to FIG. 13, there is shown a block diagram of 500 of the hardware components of a video camera implementation of the system of FIG. 12. The video camera implementation comprises an optical attachment 161 having a first lens component 162 for focusing a scene onto the variable mask 12 and a second lens component 163 for focusing the image of the scene after passing through the mask 12 and a light diffuser 131 onto the light sensing surface of a CCD light-sensing array 165. The optical attachment 161 also includes a liquid crystal mask controller 183 for applying mask control signals to the liquid crystal mask 12 for varying its transparency pattern. The block diagram 500 also includes an image sensing part 164 having a CCD light-sensing array 165 and a preamplifier 166 for adjusting the amplitude of the CCD output and for reducing noise. The preamplifier 166 includes several analog circuits which are usually implemented in a video camera, such as a correlated double circuit (a noise reduction circuit), an automatic gain control circuit, a gamma correction circuit and a knee circuit. The output of the preamplifier 166 is provided to an analog-to-digital converter 169 in the image processing part 167. The analog-to-digital converter 169 digitizes the captured images. The actual computing of the image processor 14 of FIG. 12 is carried out by the processing unit 168, which has access to a RAM 170, a ROM 171, a Frame Memory 1 172, a Frame Memory 2 178, and a Frame Memory 3 174. In the video camera implementation 500 of FIG. 13, a liquid crystal mask controller 183 provides the controlling voltage to the liquid crystal mask 12. The controlling voltages applied to the liquid crystal mask are computed by the Processing Unit 168. The ROM 171 provides storage for instructions executed by the Processing Unit 168, as well as control parameters. The RAM 170 provides temporary data storage during processing. Frame Memory 1 172 corresponds to the output image memory 7 of FIG. 12, Frame Memory 2 173 corresponds to the Exposure Pattern Memory 5 in FIG. 12, and Frame Memory 3 174 corresponds to the Monitor Image Memory 15 of FIG. 12. The high dynamic range image data stored in Frame Memory 1 172 is converted to an analog signal by a digital-to-analog converter 175 before being provided to Video Output Part 1 177, where the analog signals undergo processing by a Video Signal Processor 178, the output of which is provided to Output Unit 179, which provides a video output 181 of the high dynamic range image. The monitor image data in Frame Memory 3 174 is converted to an analog signal by digital-to-analog converter 176. The analog signal for the monitor image is provided to Video Output Part 2 180 where in undergoes processing by Video Signal Processor 181, the output of which is provided to Output Unit 182, which provides the video output 182 of the monitor image. It is noted that while Video Output Part 1 177 and Video Output Part 2 180 are part of the video camera implementation, these components have no counterparts in the basic imaging system diagram of FIG. 12.

Figure 14:
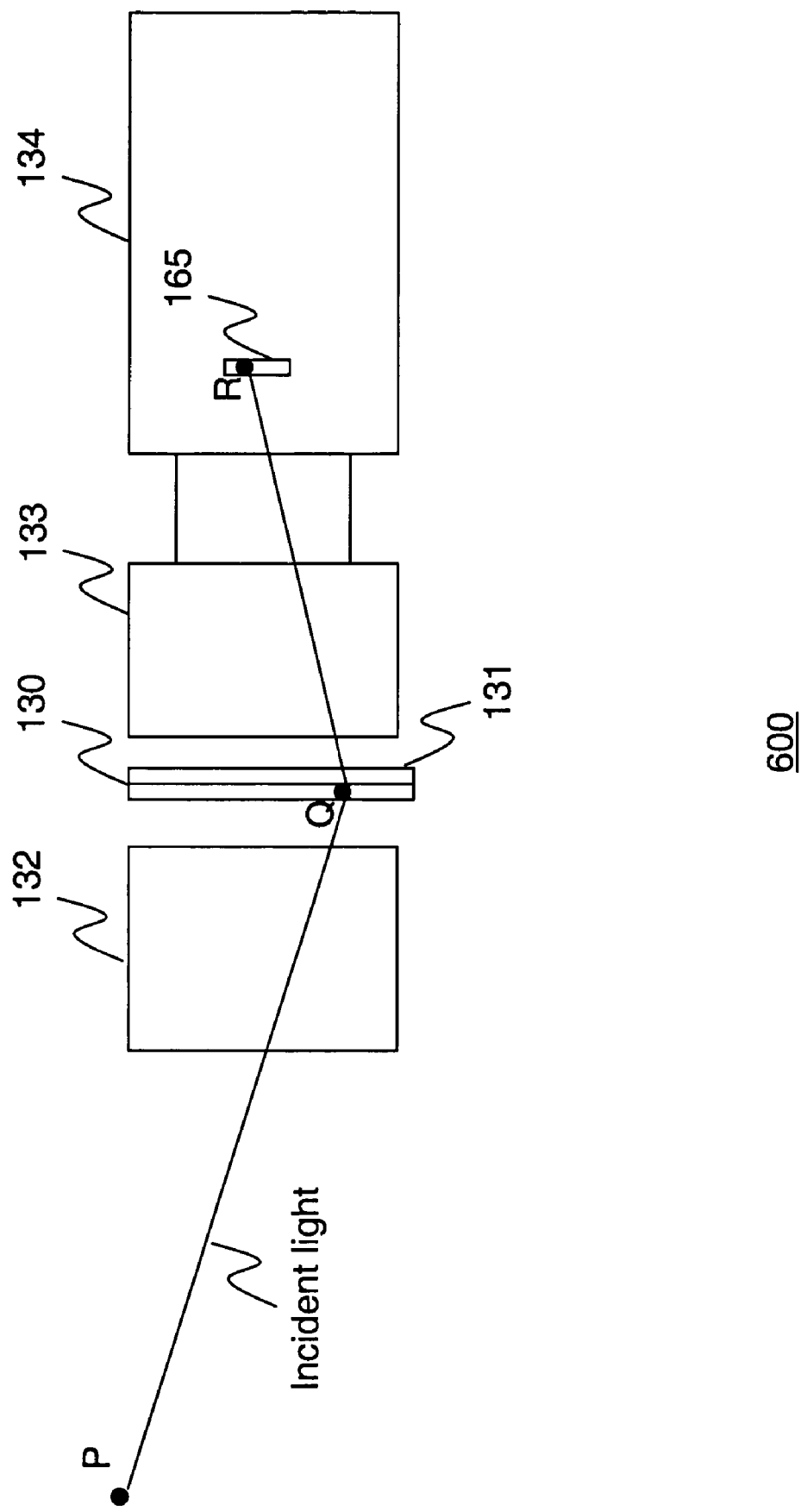
FIG. 14 is a diagram depicting the arrangement of the optical components, the mask, a light diffuser and the light-sensing array of the system of FIG. 12.

Turning now to FIG. 14, there is illustrated an exemplary structure of the image capture components 600 which may be used in the first and second exemplary embodiments of the present invention. A fixed pattern or liquid crystal mask 130 and a light diffuser 131 are positioned parallel to the image plane of a CCD light-sensing array 165, which is embedded in a camera body 134. The mask 130 and a light diffuser 131 are disposed between two optical components 132 and 133. The incident light from a scene is focused onto the mask 130 by the first optical component 132. Light attenuated by the mask 130 and passed through the light diffuser 131 is focused onto the image plane of the CCD light-sensing array 165 by the second optical component 133. In this manner, the light measured by the CCD light-sensing array 165 is in focus with respect to the mask 130 and the scene. It is noted that the light impinging on a pixel position R of the CCD image sensing device 165 comes only from a small area Q of the mask 130 through which the light has passed. The light diffuser 131 positioned directly behind the mask 130 removes directionality of focused light. Alternatively, the light diffuser 131 may be positioned directly in front of the mask 130 or two separated light diffusers may be positioned one directly in front and one directly behind the mask 130. The small area Q in turn receives light only from a single point P of the scene that is being imaged. Although a liquid crystal array is the preferred variable exposure mask for the second exemplary embodiment of the invention, other devices, such as an array of electro-optic light modulators, where the exposure pattern can be controlled by the application of appropriate signals may also be used.

Figure 15:
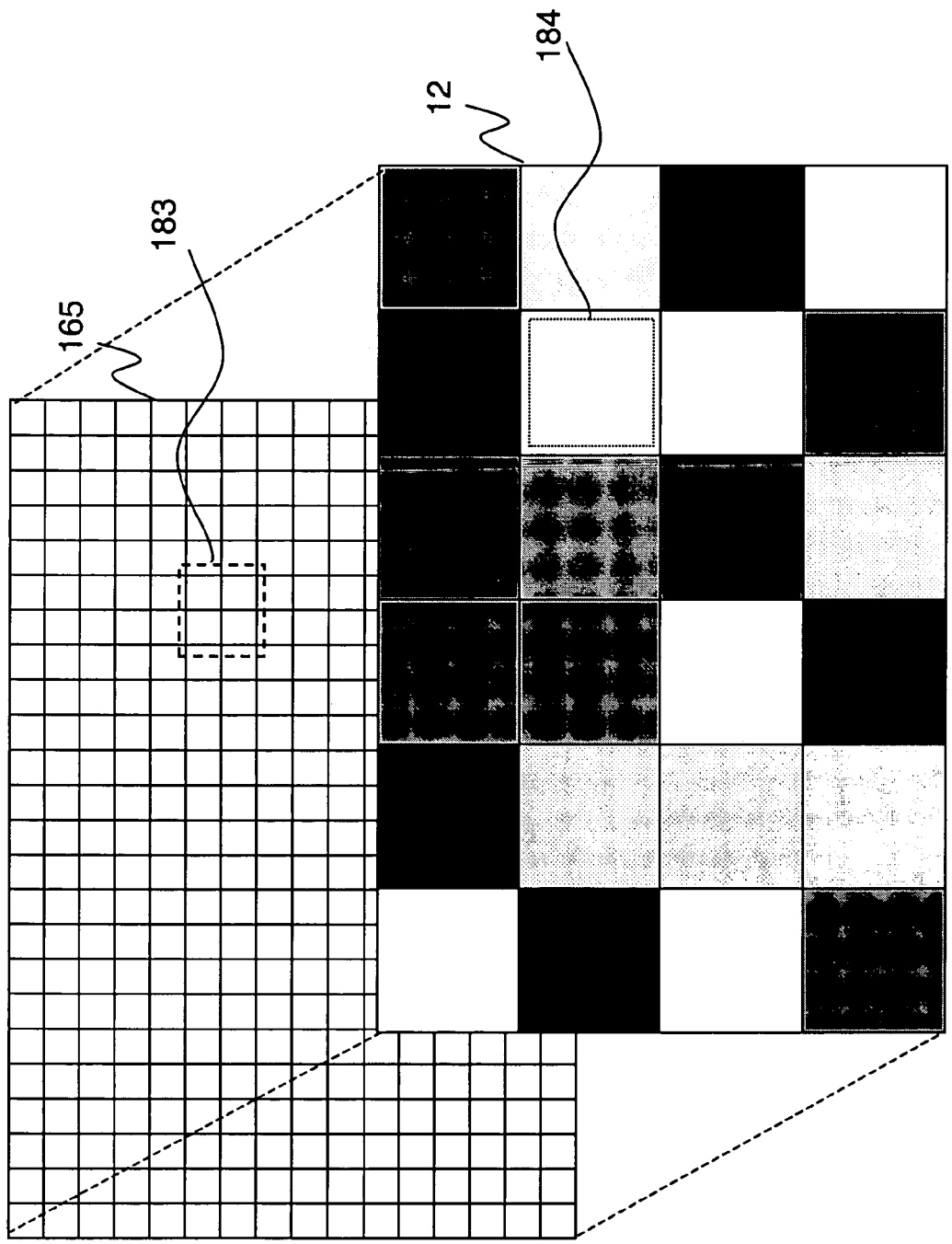
FIG. 15 is a diagram illustrating the correspondence of mask cells and the pixel positions of the image sensor of the system of FIG. 12.

As mentioned above, it is preferred that the variable mask 12 be a two-dimensional array of liquid crystal cells having transparencies that are individually controllable by the application of respective exposure control voltage signals. As shown in FIG. 15, each cell of the variable mask 12 controls the transmission of light to a respective one or more of the pixels of the light-sensing element array 165 of the image sensor 3, where each of the light-sensing elements of the array 165 corresponds to a respective pixel. For example, the 4×4 pixel area which is indicated by the dotted square 183 in the light-sensing element array 165 receives only light that has passed through the mask cell 184 of the variable mask 12. The exposure control signals that control the transparency (attenuation) of each cell of the variable mask 12 are provided by a mask controller 13 which receives the output (pixel values) of the image sensor 3 and computes the exposure control signals for the cells of the mask according to the received pixel values. The exposure control signal for each cell is computed so as to (1) minimize the number of saturated or blackened pixels within the corresponding area 183 of the light-sensing element array 165, (2) maximize the signal-to-noise ratio of the average pixel value provided by the image sensor 3, and (3) maximize the spatial smoothness of the exposure values of the mask cell array 12.

Figure 16:
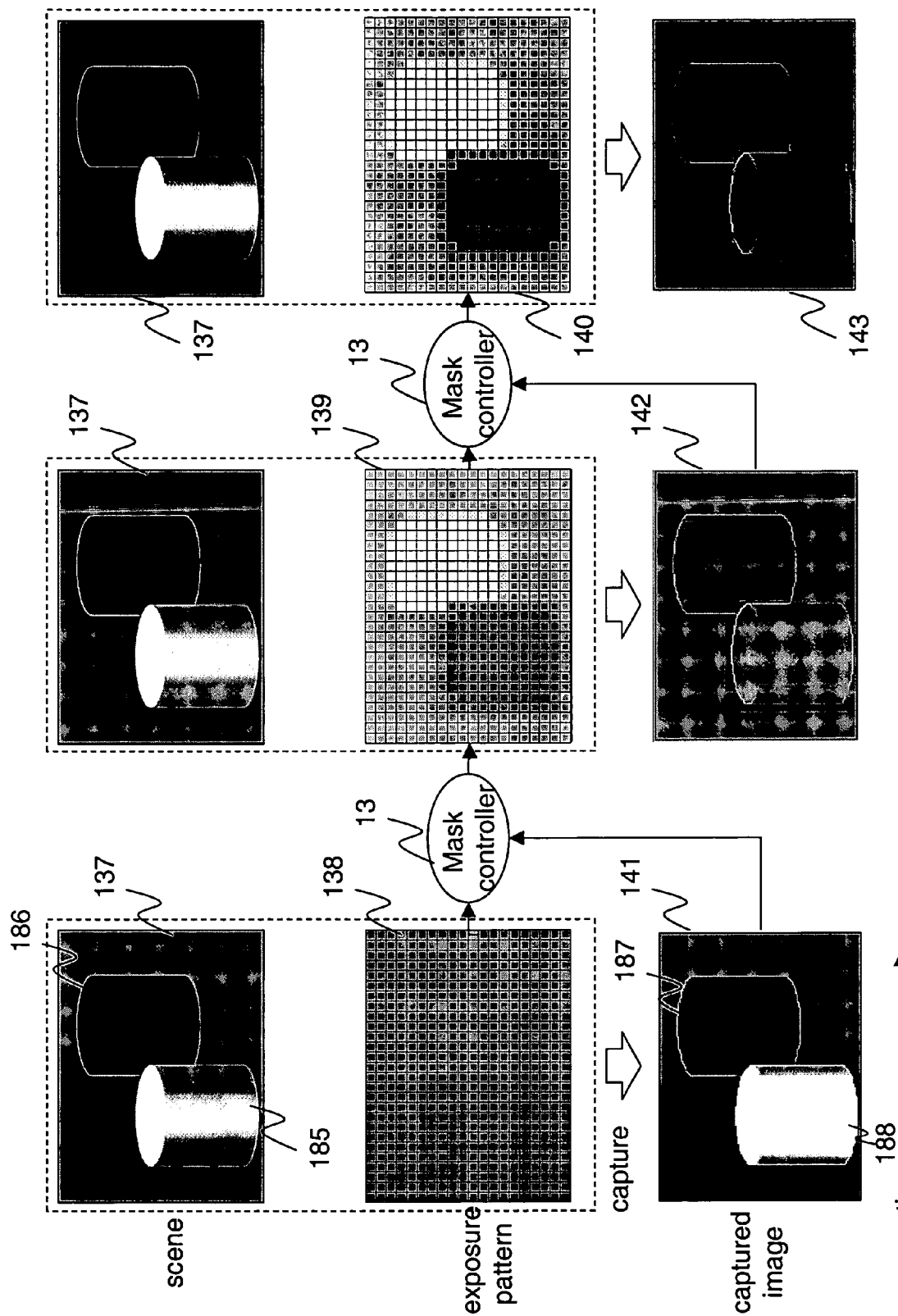
FIG. 16 are diagrams illustrating the operation of the mask controller of the system of FIG. 12 in adaptively controlling the exposure values of the mask.

Turning now to FIG. 16, there is illustrated an example of the evolution of the exposure pattern of the variable mask 12 under the control of the mask controller 13. In this figure, time shifts from left to right. The illustrations 137 at the top row of the figure represent the radiance from the scene, which in the present example remains constant over time. The illustrations 138, 139 and 140 in the center row of the figure represent the temporal change of the exposure pattern of the mask 12. The illustrations 141, 142 and 143 in the bottom row of the figure depict the temporal change of the captured image as represented by the output of the image sensor 3. In the initial state (left column), the exposure pattern 138 starts out with the same transparency (attenuation) for all of the cells of the variable mask 12. Thus, the radiance of the scene 137, which has a very bright object 185 and a very dark object 186, are equally attenuated to produce the initial captured (un-normalized) image 141. However, since the dynamic range of the image sensor 3 is low relative to the range of radiance of the scene, the initial captured image 141 does not include all of the visual details of the radiance scene 137. In the initial captured image 141, the dark object 187 is almost fully blackened and the bright object 188 is almost fully saturated. After the mask controller 13 has adjusted the exposure values of every cell of the variable mask 12 to satisfy the three criteria mentioned above, the second exposure pattern 139 results from the mask controller 13 applying new exposure control signals to the variable mask 12. In the exposure pattern 139, the exposure values of the bright object areas are decreased, the exposure values at the dark object areas are increased and the exposure values at the background areas are slightly increased. The image 142 captured using the exposure pattern 139 has no saturated or blackened pixels, and hence the details of the image are enhanced. In a like manner, the mask controller 13 continues to adjust the exposure values to obtain exposure pattern 140 which has improved smoothness. The image 143 obtained with the exposure pattern 140 shows improved image detail as a result of the improved the smoothness of the exposure pattern. It is noted that the process of adapting the exposure pattern by the exposure controller 13 is particularly suited to temporally varying scenes, such as scenes with moving objects.

Figure 17:
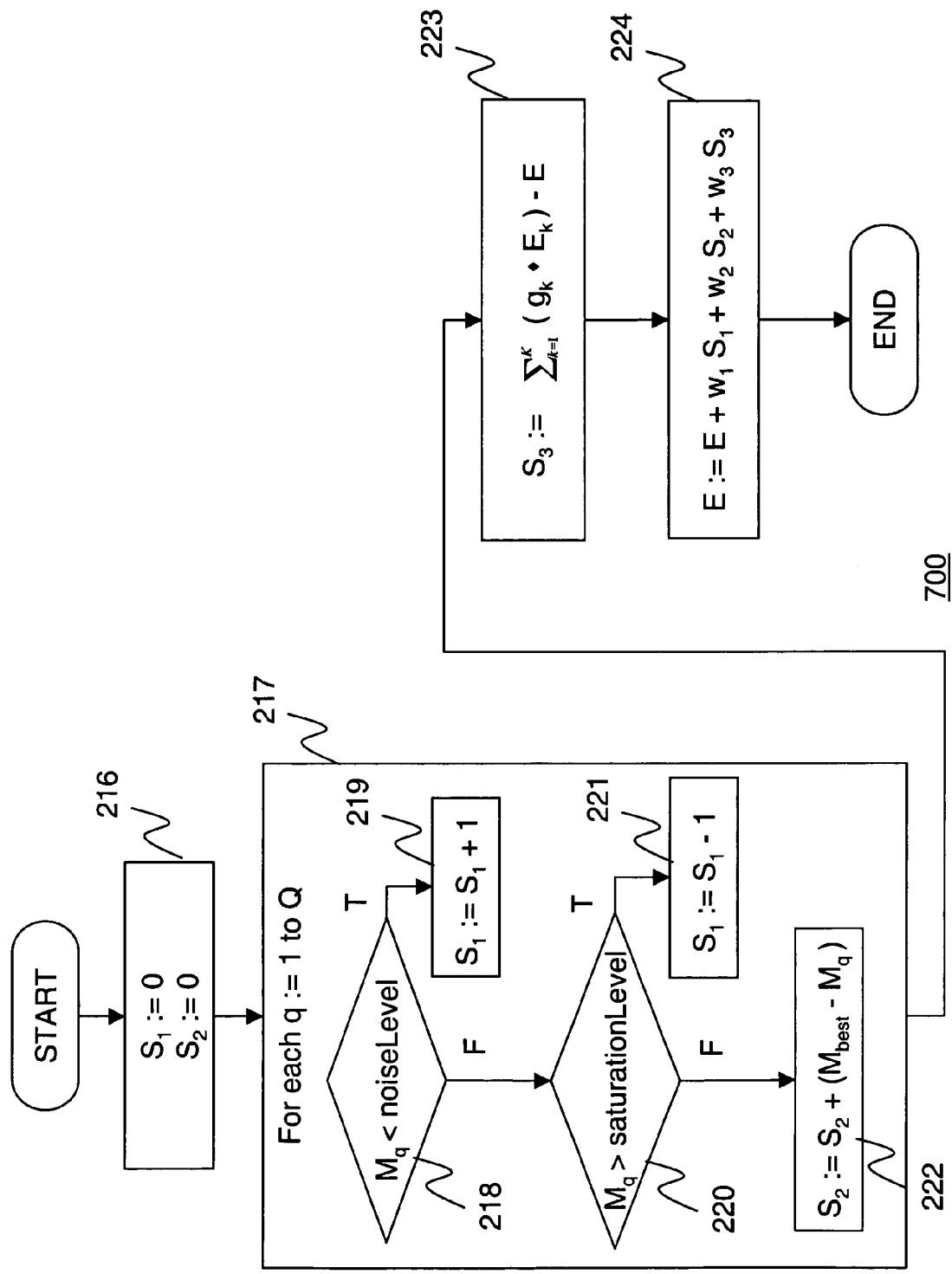
FIG. 17 is a flow diagram of the operation of the mask controller of the system of FIG. 12.

Referring now to FIG. 17, there is shown a flow diagram 700 of the processing carried out by the mask controller 13. The flow diagram 700 represents the process for computing an exposure control signal for one cell of the variable mask 12, and must therefore be repeated for each cell of the mask. In step 216, $S_1$ and $S_2$ are both initialized to zero. Here, $S_1$ indicates the exposure control value for satisfying the first criterion of minimizing the number of saturated or blackened pixel values within the area of the light-sensing element array that receives light from the mask cell, and $S_2$ indicates the exposure control value that satisfies the second criterion of maximizing the signal-to-noise ratio of the average pixel value provided by the image sensor 3. The process of loop 217 is repeated for each pixel within the area of the light-sensing element array 165 that receives light which has passed through the cell of the variable mask 12. Here, Q is the number of pixels within that area. The loop 217 includes steps 218, 219, 220, 221 and 222. In step 218, the pixel value $M_q$ is evaluated. If $M_q$ is smaller than noiseLevel, which is a predefined very small pixel value, then step 219 is carried out. Otherwise, step 222 is performed. In step 219, $S_1$ is incremented and the current iteration of loop 217 terminates. In step 220, pixel value $M_q$ is evaluated. If $M_q$ is larger than saturationLevel, which is a predefined very large pixel value, then step 221 is carried out. Otherwise, step 222 is performed. In step 221, $S_1$ is decremented, and the current iteration of the loop terminates. In step 222, $S_2$ is updated by adding the quantity $(M_{best}-M_q)$, where $M_{best}$ is a predefined pixel value which has the best signal-to-noise ratio for the image sensor 3 being used. After loop 217 is finished, steps 223 and 224 are carried out. In step 223, $S_3$ is computed by using the equation shown in block 223. In this equation, $g_k$ are weight values of a low pass kernel, $E_k$ are exposure values of the neighbor cells, and E is the exposure value of the currently processed cell. This computation provides a type of low pass filtering, which is commonly called "unsharp masking." In step 224, the exposure value E of the currently processed cell is updated by a weighted summation of $S_1$, $S_2$ and $S_3$, where the weights $w_1$, $w_2$ and $w_3$ are predefined balancing factors experimentally determined to optimize the image quality. After step 224 is finished, the processing for the currently processed cell is completed.

Figure 18:
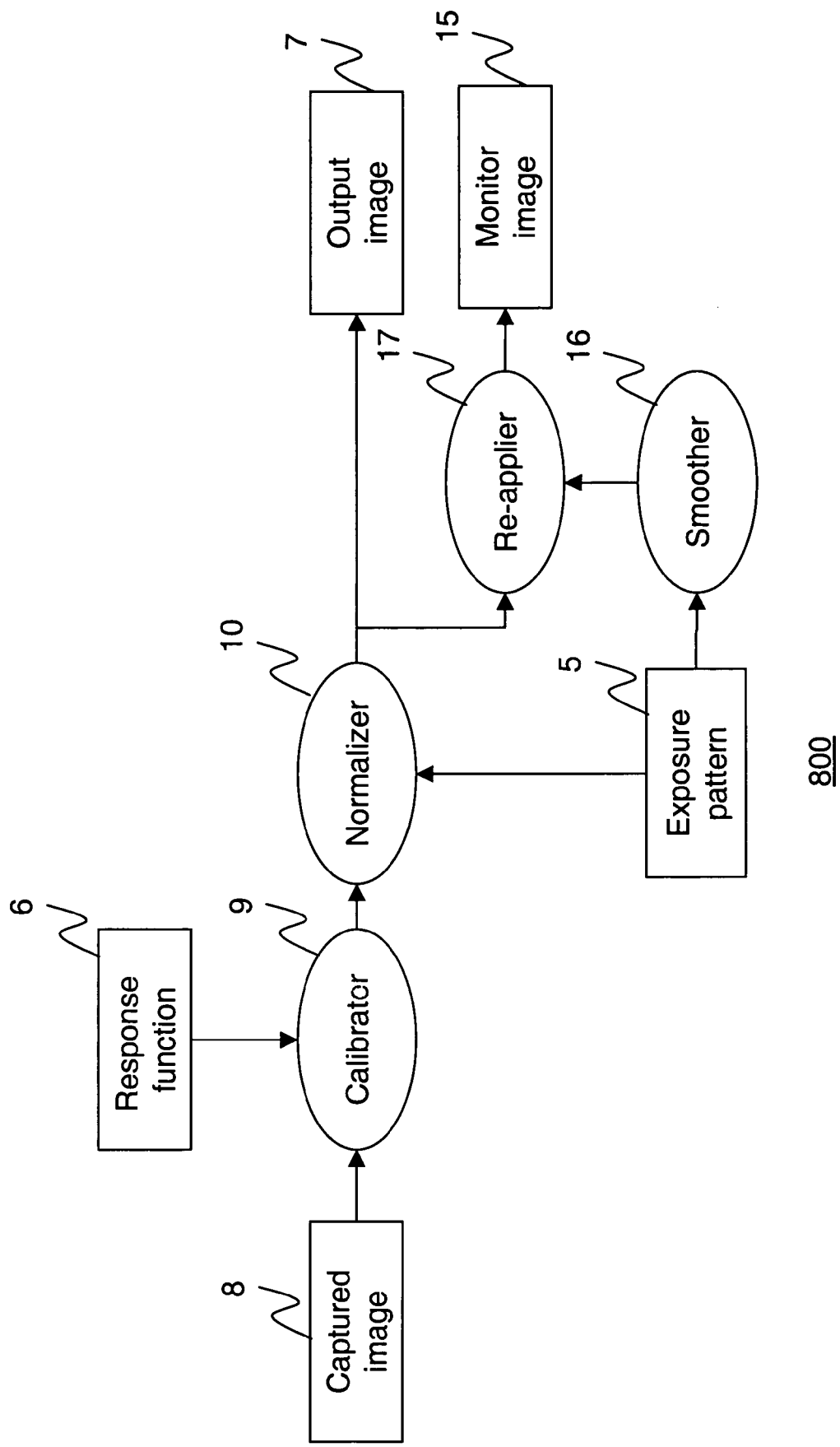
FIG. 18 is a data flow diagram of the image processor of the system of FIG. 12.

Turning now to FIG. 18, there is shown a data flow diagram 800 of the image processor 14 of the system of FIG. 12. The image processor 14 comprises a calibrator 9, a normalizer 10, a smoother 16 and an exposure reapplicator 17. As with the image processor 4 of the first exemplary embodiment of the present invention illustrated in FIG. 1, the calibrator 9 calibrates the pixel values of an image captured by image sensor 3 into a linear response image by using the response function data stored in the response function memory 6. Then the normalizer 10 converts the linear response image into an image which is proportional to the scene radiance. It is noted that the image processor 14 of the second embodiment of the present invention does not require interpolation of the output of the normalizer 10 because the exposure of the variable mask 12 is adjusted by the mask controller 13 to minimize saturated and blackened pixel values.

Figure 19:
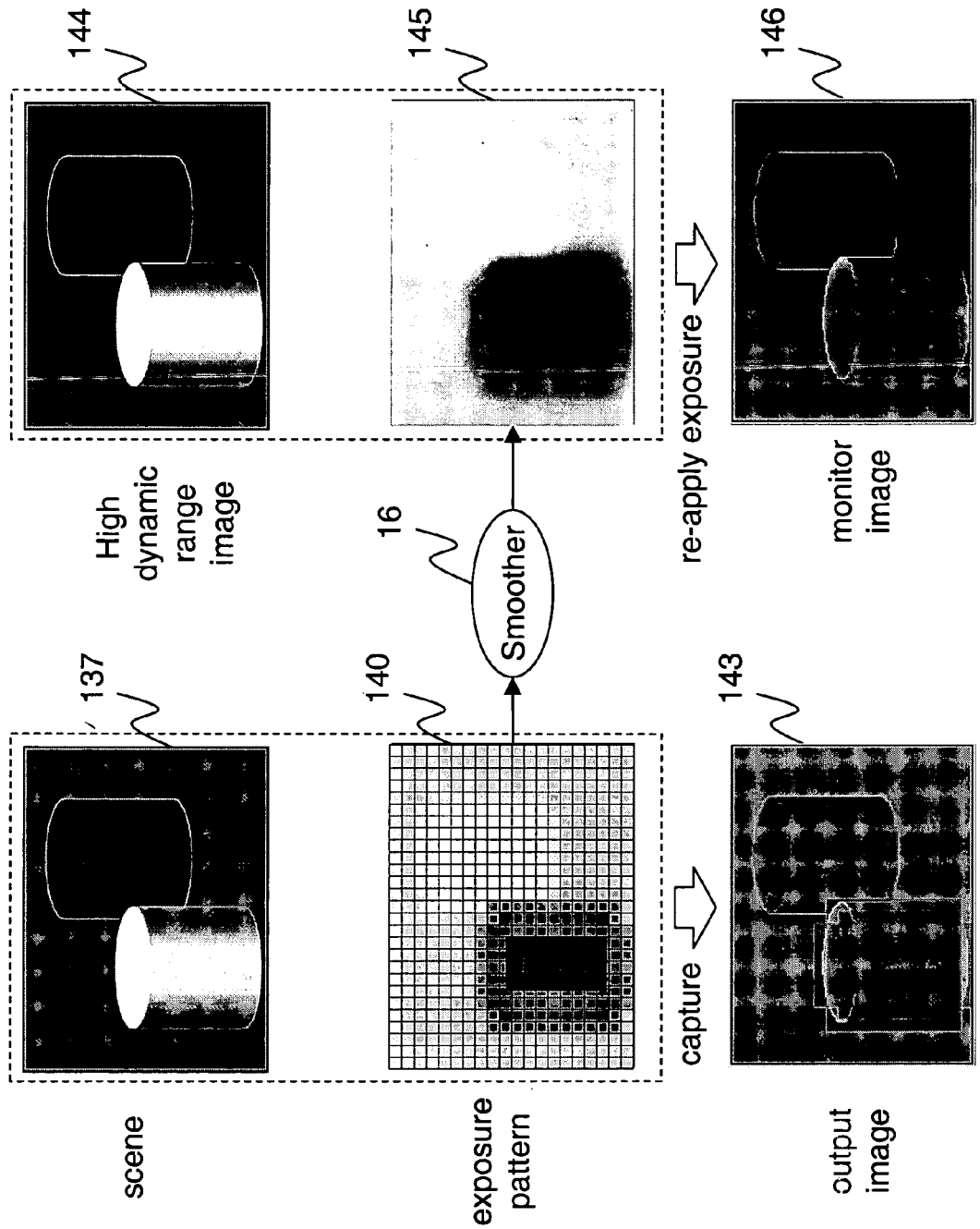
FIG. 19 are diagrams illustrating the smoothing operation of the exposure values and the reapplication of the smoothed exposure values to the captured high dynamic range image pixel values in the system of FIG. 12.
Figure 20:
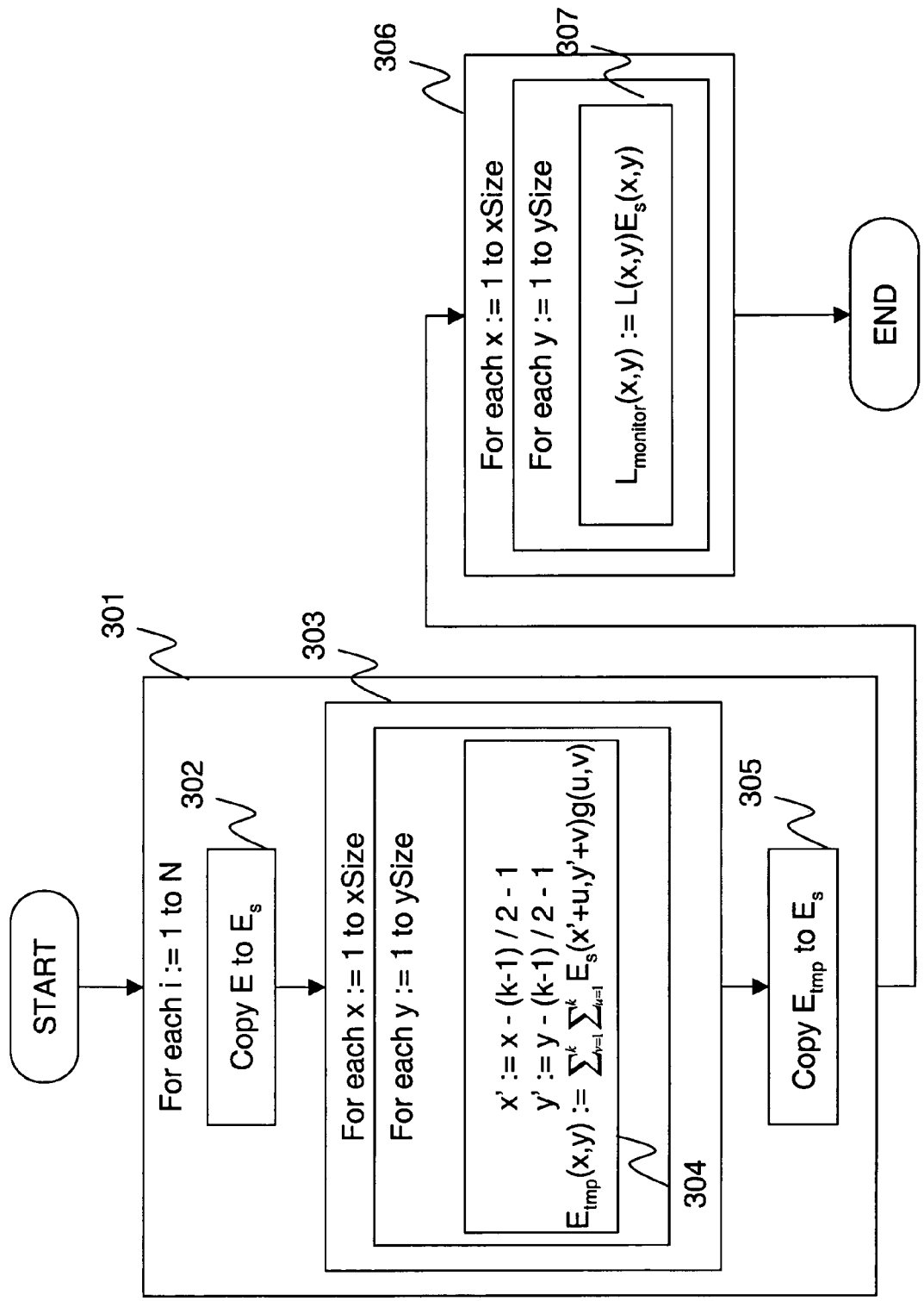
FIG. 20 is a flow diagram of the exposure value smoothing operation carried out by the system of FIG. 12.
Figure 21:
FIG. 21 is a diagram representing an example of a smoothing filter useable in the smoothing operation of FIG. 20.

Furthermore, the image processor 14 produces monitor image pixel values to be written into the monitor image memory 15. To produce the monitor image pixel values, smoother 16 smooths the exposure values from the exposure pattern memory 5. Then the exposure reapplicator 17 applies the smoothed exposure values to the pixel values of the high dynamic range image as produced by the normalizer 10. FIG. 20 illustrates the process for deriving the monitor image pixel values. The left hand column of FIG. 19 is the same as the right hand column of FIG. 16. Because after exposure control the captured image 143 still has slight discontinuities caused by the boundaries of the mask cells, it is not ideally suited for display purposes. Therefore, the smoother 16 smooths the exposure pattern 140 to derive the smoothed exposure pattern 145, which has no visible discontinuities. The monitor image 146 is then obtained by reapplying the smoothed exposure pattern 145 to the high dynamic range image 144, which has already been obtained from exposure pattern 140 and the captured (un-normalized) image 143. The monitor image 146 is better suited for display purposes than the captured image 143 or the high dynamic range image 144 because the monitor image 146 has no discontinuities and has a dynamic range similar to that of the image sensor 3. The monitor image may also serve as video output for subsequent processing Referring to FIG. 20, there is shown a flow diagram 900 of the processing carried out by the smoother 16 and the exposure reapplicator 17. With respect to smoothing, loop 301 is carried out N times, where N is a predetermined number, usually in the range from 1 to 5. In loop 301, step 302, loop 303, step 304 and step 305 are carried out. In step 302 exposure pattern data E in the exposure pattern memory 5 is copied to another memory space of the same size and is referred to as $E_s$. In the example of FIG. 20, the exposure pattern has the same dimensions as the image so that each pixel of the image has the same coordinates as its corresponding exposure value. The loop 303 is repeated for each pixel position of $E_{temp}$, which is a temporary exposure pattern data storage of the same size as E and $E_s$. In loop 303, step 304 is processed. In step 304, a smoothing filter g is applied to the current position (x, y) of $E_s$. The filtering computation is expressed in the box of step 304. The smoothing filter g(u, v) may be that shown in FIG. 21. Referring to FIG. 21, there is shown a 5×5 (k=5) Gaussian blur filter. Each number in the grid 501 expresses the filter coefficient at that position of the filter. For example, g(3,3)=0.16. Referring again to FIG. 20, the computed value in step 304 is stored in the same position (x, y) of $E_{temp}$. After loop 303 is finished, step 305 is carried out. In step 305, the smoothed exposure values in $E_{temp}$ are copied to $E_s$. After loop 301 has been repeated N times, loop 306 is carried out to implement exposure reapplication. The loop 306 is repeated for each pixel position of Es. In loop 306, step 307 is carried out. In step 307, the pixel value L(x, y) in the output image memory 7 and the exposure value $E_s$(x, y) are multiplied and the product of the multiplication is stored in the same pixel position of the monitor image memory 15 as $L_{monitor}$ (x, y). When loop 306 is completed, processing for smoothing of the exposure pattern and for reapplication of the smoothed exposure of pattern to the high dynamic range image ends.

Figure 22:
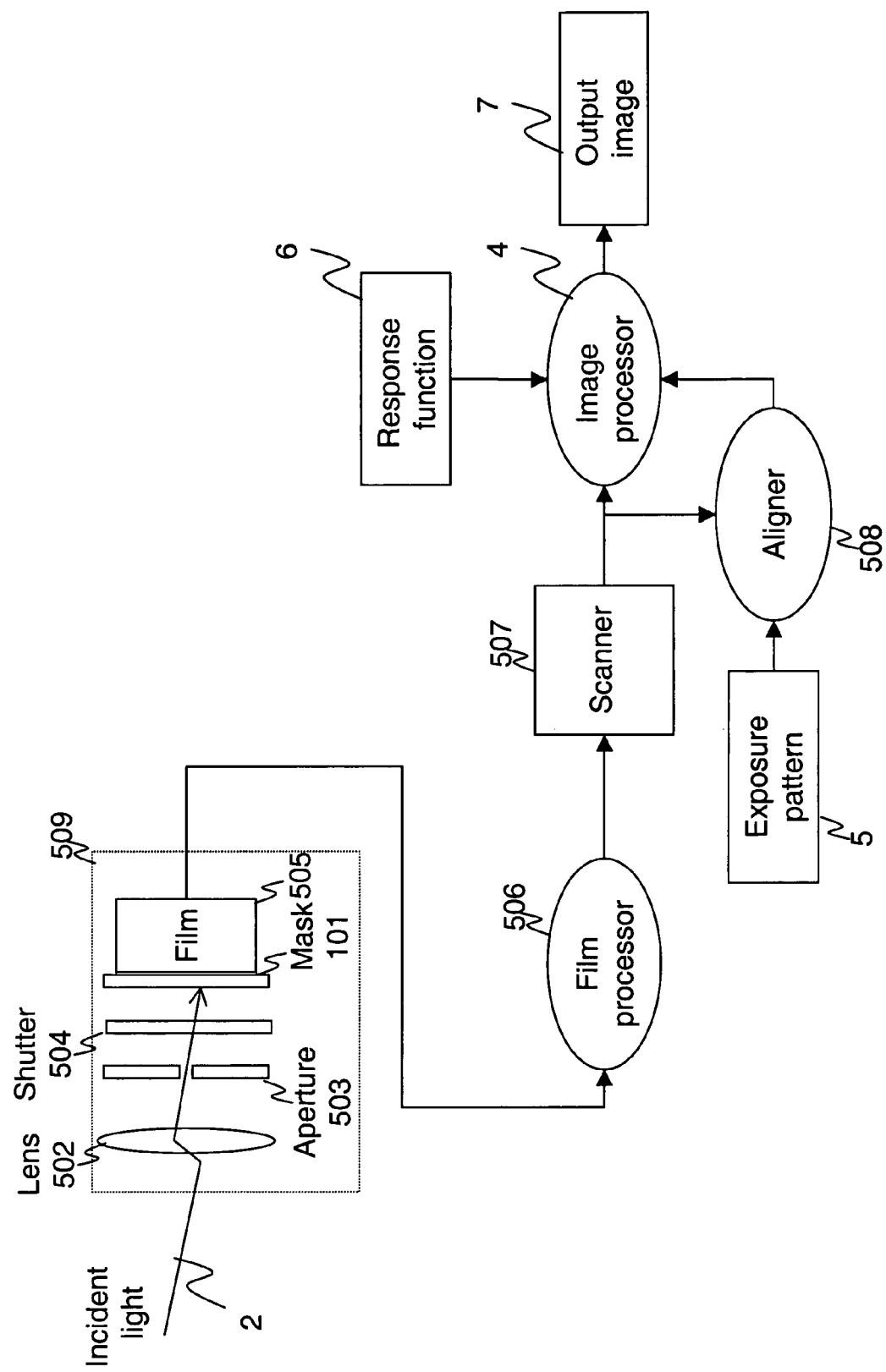
FIG. 22 is a functional diagram of an imaging system according to a third exemplary embodiment of the present invention.

Turning now to FIG. 22, there is shown a functional diagram of a system 1000 for capturing high dynamic range images of a scene according to a third exemplary embodiment of the present invention. The system includes a photographic film camera 509 for exposing a masked image of a scene onto photographic film. As mentioned above, the masked image may be obtained by providing a mask 101 having a spatially varying transparency pattern, such as that shown in FIG. 4A, between the shutter 504 of the camera and the plane of the film 505. Alternatively, the mask may be attached to each frame of film or the film emulsion may have a spatially varying pattern of exposure sensitivity. In each case, the exposure value for each region of the film has been previously determined and is stored in an exposure pattern memory 5. After being exposed with a masked image, the film is processed to produce either a transparency or a print containing the masked image. The film or print containing the masked image is then scanned by a scanner 507 which provides pixel values representative of the masked image. The pixel values are provided to an image processor 4 which may be identical to the image processor of the system of FIG. 1 and may have a data flow diagram identical to the one shown in FIG. 3. The combined response function of the film and the scanner are stored in a response function memory 6 to be used by the image processor 4 for calibration purposes. Instead of receiving exposure values directly from the exposure pattern memory 5, the system 1000 of FIG. 22 includes an aligner which receives the output of the scanner 507 and the exposure values stored in exposure pattern memory 5, and provides alignment corrected exposure values to the image processor for normalization purposes. The image processor 4 provides a high dynamic range output image to an output image memory 7. In typical film cameras, the film is moved frame by frame with each frame being positioned behind the shutter 504. This movement of the film causes some misalignment between the currently exposed frame of the film 505 and the mask 101. The aligner 508 is used to correct for such misalignment.

Figure 23:
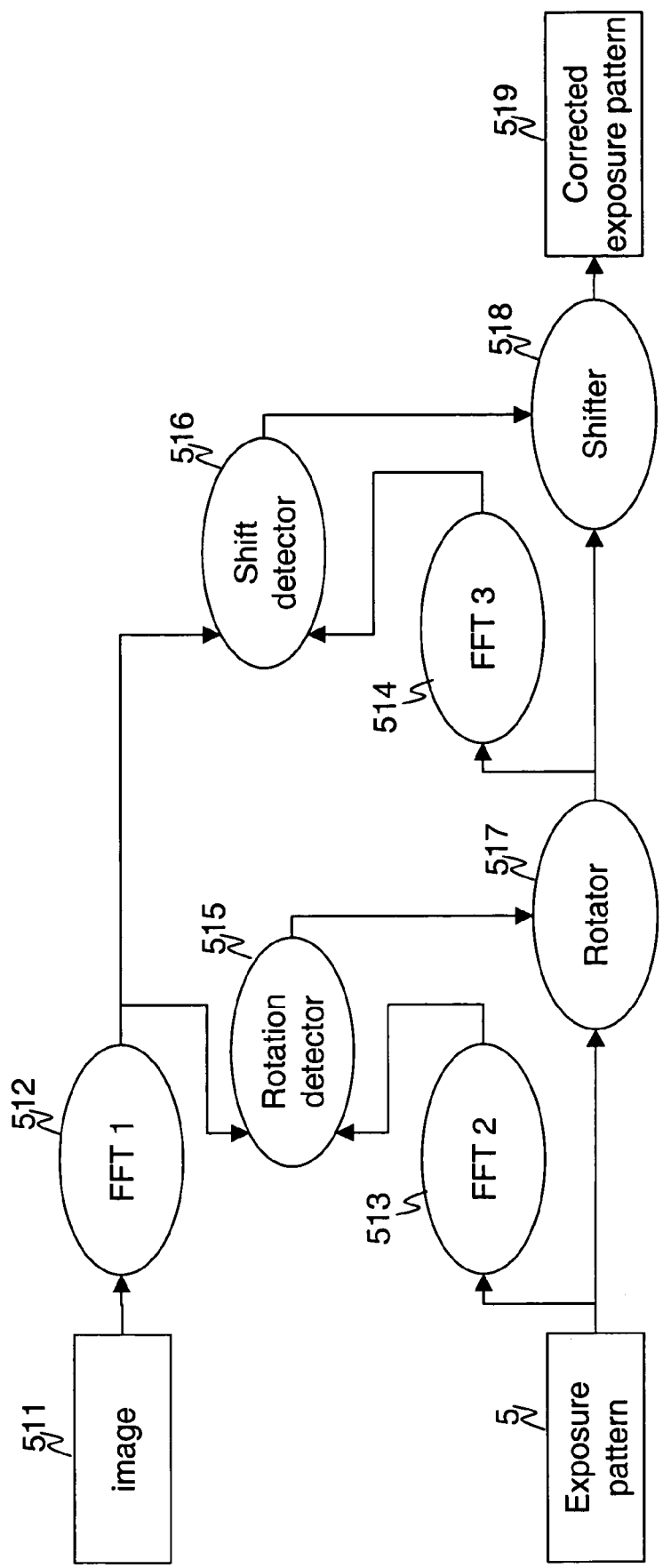
FIG. 23 is a diagram depicting the detailed structure of the aligner of the imaging system of FIG. 22.
Figure 24:
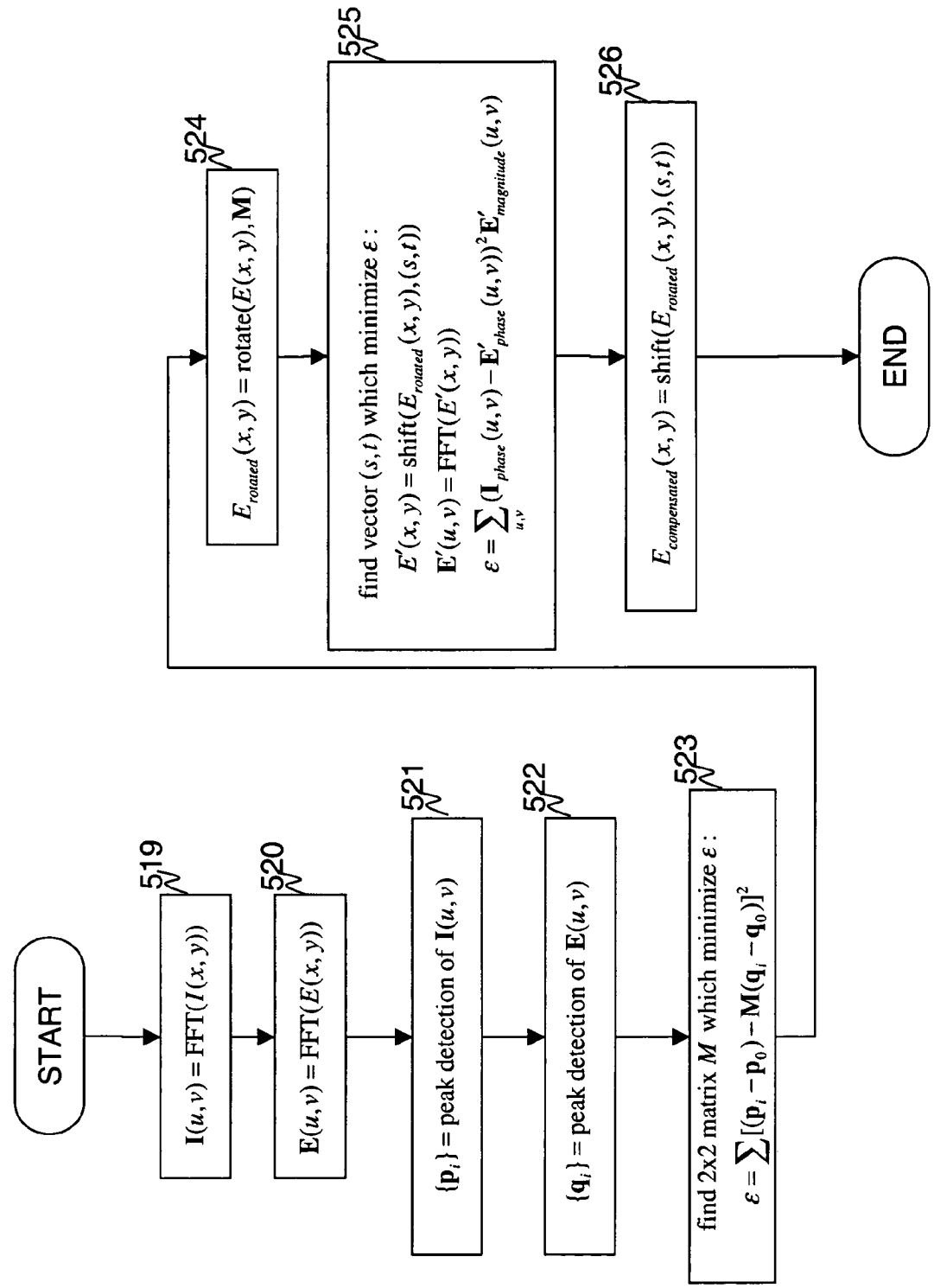
FIG. 24 is a flow diagram of the operation of the aligner of the imaging system of FIG. 22.

Turning now to FIG. 23, there is shown a data flow diagram 1100 of the aligner 508 in FIG. 22. The aligner 1100 has three fast Fourier transform processors 512, 513 and 514, a rotation detector 515, a shift detector 516, a rotator 517 and a shifter 518. The process carried out by the aligner 508 is represented by the flow diagram in FIG. 24. Referring to FIG. 24, in step 519 the Fourier transform I(u, v) of the image I(x, y) is computed by FFT1 512. In step 520, the Fourier transform E(u, v) of the exposure pattern E(x, y) is computed by FFT2 513. In step 521, the positions of the peaks of the magnitude of I(u, v) are detected. In step 522, the positions of the peaks of the magnitude of E(u, v) are detected. In step 523, a 2×2 rotation matrix M is estimated by least square optimization with the error function which is shown in block 523. Steps 521, 522 and 523 are all carried out by the rotation detector 515 in FIG. 23. In step 524, a rotated exposure pattern $E_{rotated}$ (x, y) is computed by rotating the exposure pattern E(x, y) with the rotation matrix M. Step 524 is carried out by the rotator 517 of FIG. 23. In step 525, a shift vector (s, t) is estimated by searching for the shift vector which minimizes the error function shown in box 525. Finally, in step 526 the corrected exposure pattern $E_{corrected}$ (x, y) is computed by shifting $E_{rotated}$(x, y) by the shift vector (s, t). The corrected exposure pattern $E_{corrected}$ (x, y) is provided to a corrected exposure pattern memory 519 for use by the image processor 4 for normalization purposes.

While the present invention has been particularly described with reference to exemplary embodiments thereof, it will be understood by those skilled in the art that various modifications and alterations may be made without departing from the spirit and scope of the invention. Accordingly, the disclosed embodiments of the invention are considered merely illustrative, and the invention is limited in scope only as specified in the appended claims.

The invention claimed is:

1. A system for high dynamic range imaging comprising:
an image sensor comprising an array of light sensing elements, the image sensor sensing an image of a scene and providing corresponding pixel values representing light intensities impinging on respective ones of the light sensing elements, the image sensor providing a saturated pixel value when the intensity of light impinging on a corresponding one of the light sensing elements is greater than a first threshold level and providing a blackened pixel value when the intensity of light impinging on a corresponding one of the light sensing elements is below a second threshold level, the image sensor having a low dynamic range relative to the range of intensities of the image of the scene;
a mask interposed between the scene and the array of light sensing elements of the image sensor, the mask having a multiplicity of light transmitting cells that attenuate the intensity of scene light transmitted through the mask on to the light-sensing elements, wherein the light-transmitting cells are configured so that the intensity of scene light transmitted on to the light sensing elements is attenuated by brightness level amounts that vary spatially across the array of light-sensing elements, and whereby the scene is exposed to the light sensing elements in a spatially varying manner, each of the light sensing elements having a corresponding exposure value indicative of the transparency of the cells through which light impinging on the light sensing element passes, the transparency of each of the cells of the mask being alterable by applying a respective exposure control signal to the mask;
a mask controller coupled to the image sensor for receiving the pixel values provided thereby and for computing, and applying to the mask, exposure control signals for minimizing the number of saturated pixel values and blackened pixel values from the image sensor, and providing exposure values corresponding to the applied exposure control signals; and
an image processor coupled to the image sensor for receiving the pixel values provided thereby, the image processor comprising a normalizer for mapping the pixel values by a function of the exposure values to derive corresponding normalized pixel values.

2. The system according to claim 1, wherein the normalizer of the image processor divides each of the pixel values by the exposure value corresponding to the light sensing element receiving light intensity represented by the pixel value to derive corresponding normalized pixel values.

3. The system according to claim 1, further comprising an exposure pattern memory coupled to the mask controller for receiving and storing the exposure values, and wherein the image processor is coupled to the exposure pattern memory for receiving the exposure values corresponding to the pixel values from the image sensor.

4. The system according to claim 1 further comprising an output image memory coupled to the normalizer of the image processor for receiving and storing the normalized pixel values.

5. The system according to claim 1, wherein the mask controller computes the exposure control signals to maximize the signal to noise ratio of the average pixel value provided by the image sensor.

6. The system according to claim 1, wherein the mask controller computes the exposure control signals to maximize the spatial smoothness of the exposure values corresponding to the light sensing elements of the image sensor.

7. The system according to claim 1, wherein the mask is made of a nonlinear optical material.

8. The system according to claim 1, wherein the mask is integrated with the light sensing elements on a same substrate.

9. The system according to claim 1 further comprising a second memory storing a response function of the image sensor, wherein the image processor is coupled to the second memory for receiving the response function and further comprises a calibrator for converting the pixel values provided by the image sensor to linear response pixel values in accordance with the response function before the pixel values are normalized by the normalizer.

10. The system according to claim 1, wherein the array of light sensing elements is a solid state image sensing device.

11. The system according to claim 10, wherein the solid state image sensing device is a charge coupled device light sensing array.

12. The system according to claim 10, wherein the solid state image sensing device is a CMOS light sensing array.

13. A method for high dynamic range imaging comprising the steps of:
exposing an image sensor to light from a scene to sense an image frame, a wherein the image sensor comprises an array of light sensing elements;
interposing a mask between the scene and the array of light sensing elements of the image sensor, the mask having a multiplicity of light transmitting cells that attenuate the intensity of scene light transmitted through the mask on to the light-sensing elements, the transparency of each of the cells of the mask being alterable by applying a respective exposure control signal to the mask;
applying exposure control signals to the light-transmitting cells so that the intensity of scene light transmitted on to the light sensing elements is attenuated by brightness level amounts that vary spatially across the array of light-sensing elements, and whereby the scene is exposed to the light sensing elements in a spatially varying manner, each of the light sensing elements having a corresponding exposure value indicative of the transparency of the cells through which light impinging on the light sensing element passes, the image sensor sensing the spatially varying exposure image and providing corresponding pixel values representing light intensities impinging on respective ones of the light sensing elements, the image sensor providing a saturated pixel value when the intensity of light impinging on a corresponding one of the light sensing elements is greater than a first threshold level and providing a blackened pixel value when the intensity of the light impinging on a corresponding one of the light sensing elements is below a second threshold level, the image sensor having a low dynamic range relative to the range of light intensities of the image of the scene; and
normalizing the pixel values provided by the image sensor with respect to the spatially varying exposure of the scene by the light sensing elements to derive corresponding normalized pixel values.

14. The method of claim 13 further comprising the step of calibrating the pixel values provided by the image sensor according to a response function of the image sensor to derive linear response pixel values before the step of normalizing the pixel values.

15. The method according to claim 13, wherein normalizing the pixel values includes the step of mapping the pixel values by a function of the corresponding exposure values to derive corresponding normalized pixel values.

16. The method according to claim 15, wherein the step of mapping the pixel values by a function of the exposure values comprises dividing each of the pixel values with the exposure value corresponding to the light sensing element receiving light intensity represented by the pixel value.

* * * * *

UNITED STATES PATENT AND TRADEMARK OFFICE
CERTIFICATE OF CORRECTION

PATENT NO. : 7,924,321 B2  
APPLICATION NO. : 10/886746  
DATED : April 12, 2011  
INVENTOR(S) : Shree K. Nayar et al.

Page 1 of 1

It is certified that error appears in the above-identified patent and that said Letters Patent is hereby corrected as shown below:

Column 1, line 4, prior to "CROSS REFERENCE TO RELATED AND PRIORITY APPLICATION," please insert the following paragraph:

-- STATEMENT REGARDING FEDERALLY SPONSORED RESEARCH OR DEVELOPMENT
This invention was made with government support under Grant No. N00014-97-1-0553 awarded by the Office of Naval Research and DARPA MURI. The government has certain rights in the invention. --

Signed and Sealed this
Twelfth Day of February, 2013

Teresa Stanek Rea
*Acting Director of the United States Patent and Trademark Office*